US012737842B2

(12) United States Patent
Ke et al.

(10) Patent No.: US 12,737,842 B2
(45) Date of Patent: Sep. 15, 2026

(54) DIFFUSION-BASED UNIVERSAL EFFECT TRANSFER

(71) Applicant: ADOBE INC., San Jose, CA (US)

(72) Inventors: Zhanghan Ke, Kowloon Tong (HK); Nanxuan Zhao, San Jose, CA (US); Yilin Wang, Sunnyvale, CA (US); Yijun Li, Seattle, WA (US)

(73) Assignee: ADOBE INC., San Jose, CA (US)

( * ) Notice: Subject to any disclaimer, the term of this patent is extended or adjusted under 35 U.S.C. 154(b) by 197 days.

(21) Appl. No.: 18/812,198

(22) Filed: Aug. 22, 2024

(65) Prior Publication Data

US 2026/0057479 A1 Feb. 26, 2026

(51) Int. Cl.

| | |
|---|---|
| ***G06T 3/40*** | (2024.01) |
| ***G06T 3/4046*** | (2024.01) |
| ***G06T 3/4053*** | (2024.01) |

(52) U.S. Cl.
CPC .......... *G06T 3/4053* (2013.01); *G06T 3/4046* (2013.01)

(58) Field of Classification Search
CPC ............................ G06T 3/4053; G06T 3/4046
See application file for complete search history.

(56) References Cited

U.S. PATENT DOCUMENTS 11,995,803 B1 * 5/2024 Karpman .................. G06T 5/70
2010/0141823 A1 * 6/2010 Tsunekawa ........... G06T 3/4053 348/333.12
2011/0228295 A1 * 9/2011 Doida .................... H04N 23/70 358/1.9
2017/0109930 A1 * 4/2017 Holzer .................... G06T 13/20

FOREIGN PATENT DOCUMENTS

JP 2006-222493 * 8/2006
WO WO 2024/032494 * 2/2024

OTHER PUBLICATIONS

Machine translation for WO 2024/032494 (Year: 2024).*
Machine translation for JP 2006-222493 (Year: 2006).*
Abdal et al. "Image2StyleGAN++: How to Edit the Embedded Images?", Proceedings of the IEEE/CVF Conference on Computer Vision and Pattern Recognition (CVPR), 2020, pp. 8296-8305 (Year: 2020).*
Bansal et al., "PixelNN: Example-based Image Synthesis", arXiv:1708.05349 (Year: 2017).*

(Continued)

*Primary Examiner* — Qian Yang
(74) *Attorney, Agent, or Firm* — F. CHAU & ASSOCIATES, LLC

(57) ABSTRACT

A method, apparatus, non-transitory computer readable medium, and system for image processing include obtaining an input image and a reference effect prompt, where the reference effect prompt indicates an image effect for the input image, generating an intermediate image based on the reference effect prompt, where the intermediate image depicts the image effect applied to the input image, and generating a synthetic image based on the input image, the reference effect prompt, and the intermediate image, where the synthetic image depicts the image effect applied to the input image and has a higher resolution than the intermediate image.

20 Claims, 12 Drawing Sheets

(56) References Cited

OTHER PUBLICATIONS

Ho, et al., "Denoising Diffusion Probabilistic models", in Advances in neural information processing systems, 33, Dec. 2020, 12 pages.
Kuznetsova, et al., "The Open Images Dataset V4: Unified Image classification, object detection, and visual relationship detection at scale", in International journal of computer vision, 128(7), arXiv preprint arXiv:1811.00982v2 [cs.CV] Feb. 21, 2020, pp. 1-26.
Gao, et al., "Implicit Diffusion Models for Continuous Super-Resolution", In Proceedings of the IEEE/CVF conference on computer vision and pattern recognition, Jun. 2023, pp. 10021-10030.
Radford, et al., "Learning Transferable Visual Models From Natural Language Supervision", In International conference on machine learning, Jul. 2021, PMLR, 16 pages.
Ramesh, et al., "Hierarchical Text-Conditional Image Generation with CLIP Latents", arXiv preprint arXiv:2204.06125v1 [cs.CV] Apr. 13, 2022, 27 pages.
Rombach, et al., "High-Resolution Image Synthesis with Latent Diffusion Models", In Proceedings of the IEEE/CVF conference on computer vision and pattern recognition, Jun. 2022, pp. 10684-10695.

* cited by examiner

Synthetic Image

110

120

115

Input Image

Reference Effect Input

Figure 2:
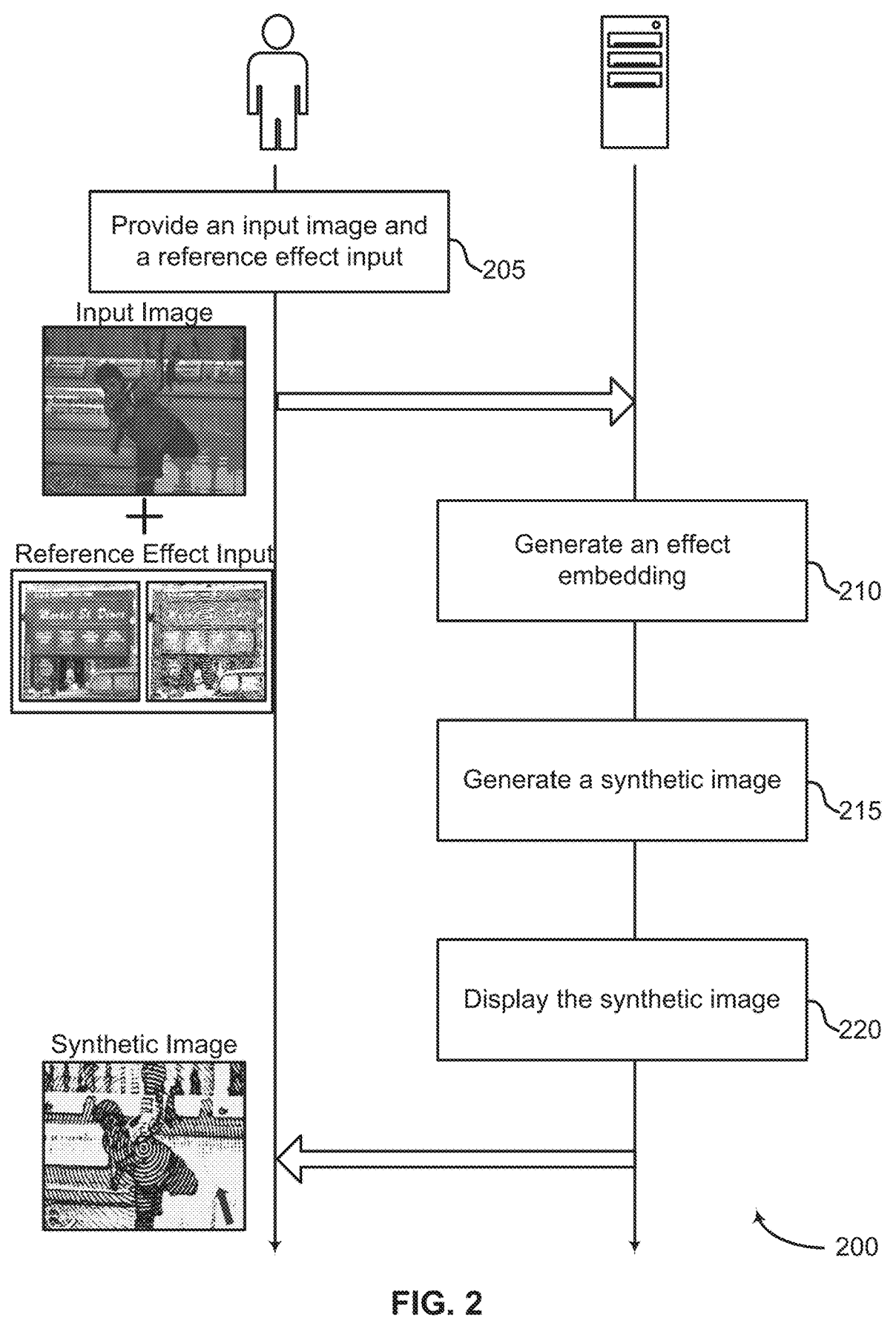

Provide an input image and a reference effect input
205
Input Image
+
Reference Effect Input
Generate an effect embedding
210
Generate a synthetic image
215
Display the synthetic image
220
Synthetic Image
200

DIFFUSION-BASED UNIVERSAL EFFECT TRANSFER

BACKGROUND

The following relates generally to image processing, and more specifically to image generation using a machine learning model. Image processing refers to the use of a computer to edit an image using an algorithm or a processing network. In some cases, image processing software can be used for various image processing tasks, such as image restoration, image detection, image editing, image compositing, and image generation. In some cases, a machine learning model is used to generate a synthetic image based on a conditioning. For example, the machine learning model is trained to generate a synthetic image based on a text, a color, a style, or an image.

SUMMARY

Aspects of the present disclosure provide a method and system for image generation. In one aspect, the system receives an input image and a pair of reference effect images to generate a synthetic image depicting content from the input image with applied style effect from the pair of reference effect images. The system includes an effect encoder trained to generate an effect embedding based on the pair of reference effect images. The system includes an image generator configured to generate a low-resolution intermediate image based on the effect embedding. In some cases, the low-resolution intermediate image depicts the style effect applied to the input image. The system includes an upsampler trained to generate a high-resolution synthetic image based on the input image, the effect embedding, and the low-resolution intermediate image.

A method, apparatus, non-transitory computer readable medium, and system for image processing include obtaining an input image and a reference effect prompt, wherein the reference effect prompt indicates an image effect for the input image; generating, using a generator of an image generation model, an intermediate image based on the reference effect prompt, wherein the intermediate image depicts the image effect applied to the input image; and upsampling, using an upsampler of the image generation model, the intermediate image to generate a synthetic image based on the reference effect prompt, wherein the synthetic image depicts the image effect applied to the input image and has a higher resolution than the intermediate image.

A method, apparatus, non-transitory computer readable medium, and system for image processing include obtaining a training set including a training image, an effect prompt indicating an effect for the training image, and a ground-truth image depicting the effect applied to the training image; and training, using the training set, an upsampler of an image generation model to perform upsampling based on the effect prompt, wherein the image generation model includes a generator that generates an intermediate image based on the effect prompt and the upsampler that upsamples the intermediate image to generate a synthetic image having the effect.

An apparatus and system for image processing include at least one processor; at least one memory storing instructions executable by the at least one processor; and an image generation model comprising parameters stored in the at least one memory, wherein the image generation model includes a generator that generates an intermediate image based on a reference effect prompt that indicates an image effect for an input image and an upsampler trained to upsample the intermediate image to generate a synthetic image based on the input image and the reference effect prompt, wherein the synthetic image depicts the image effect applied to the input image and has a higher resolution than the intermediate image.

BRIEF DESCRIPTION OF THE DRAWINGS

Figure 1:
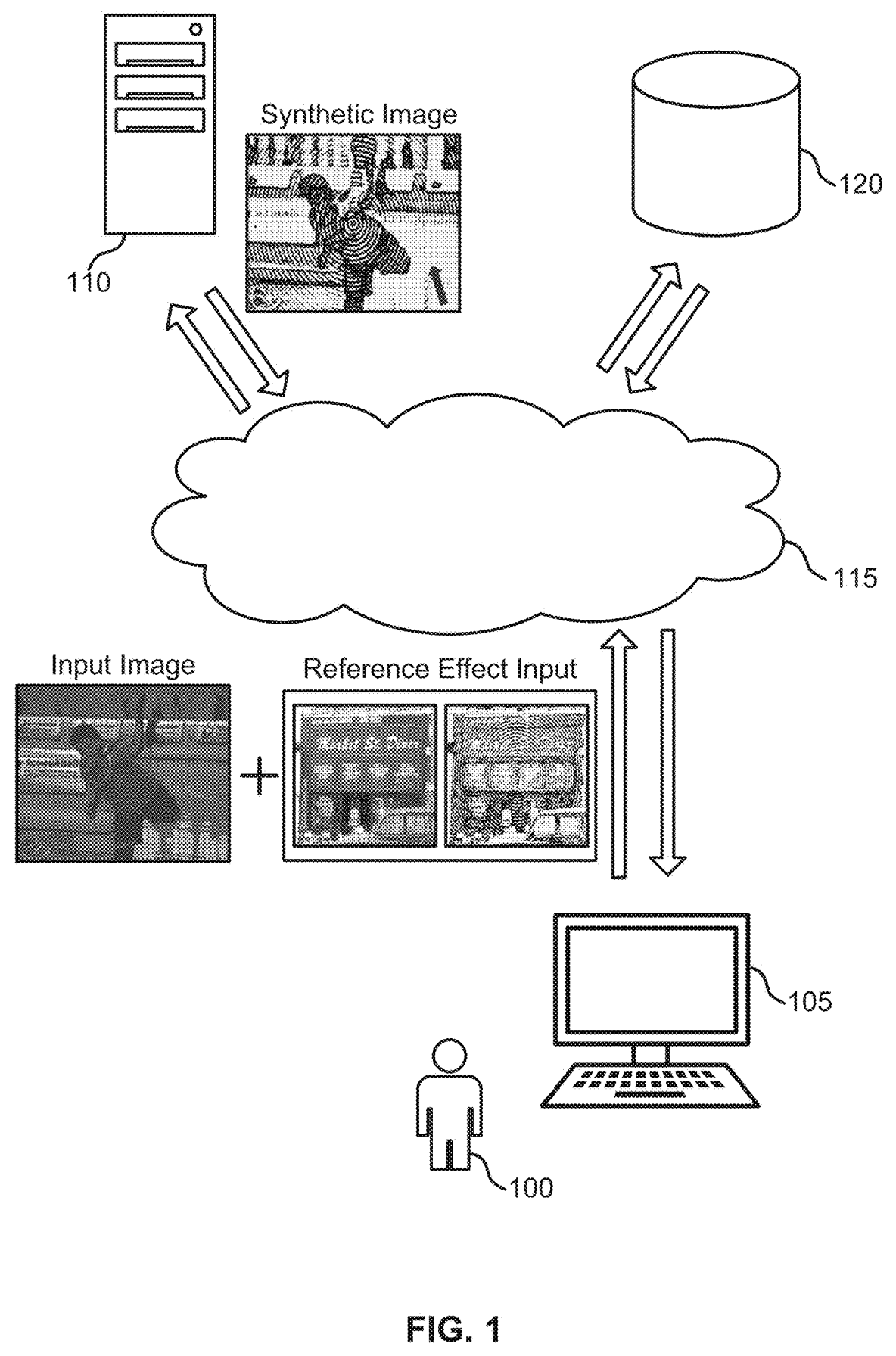

FIG. 1 shows an example of an image processing system according to aspects of the present disclosure.

FIG. 2 shows an example of a method for image generation using image effect prompt according to aspects of the present disclosure.

Figure 11:
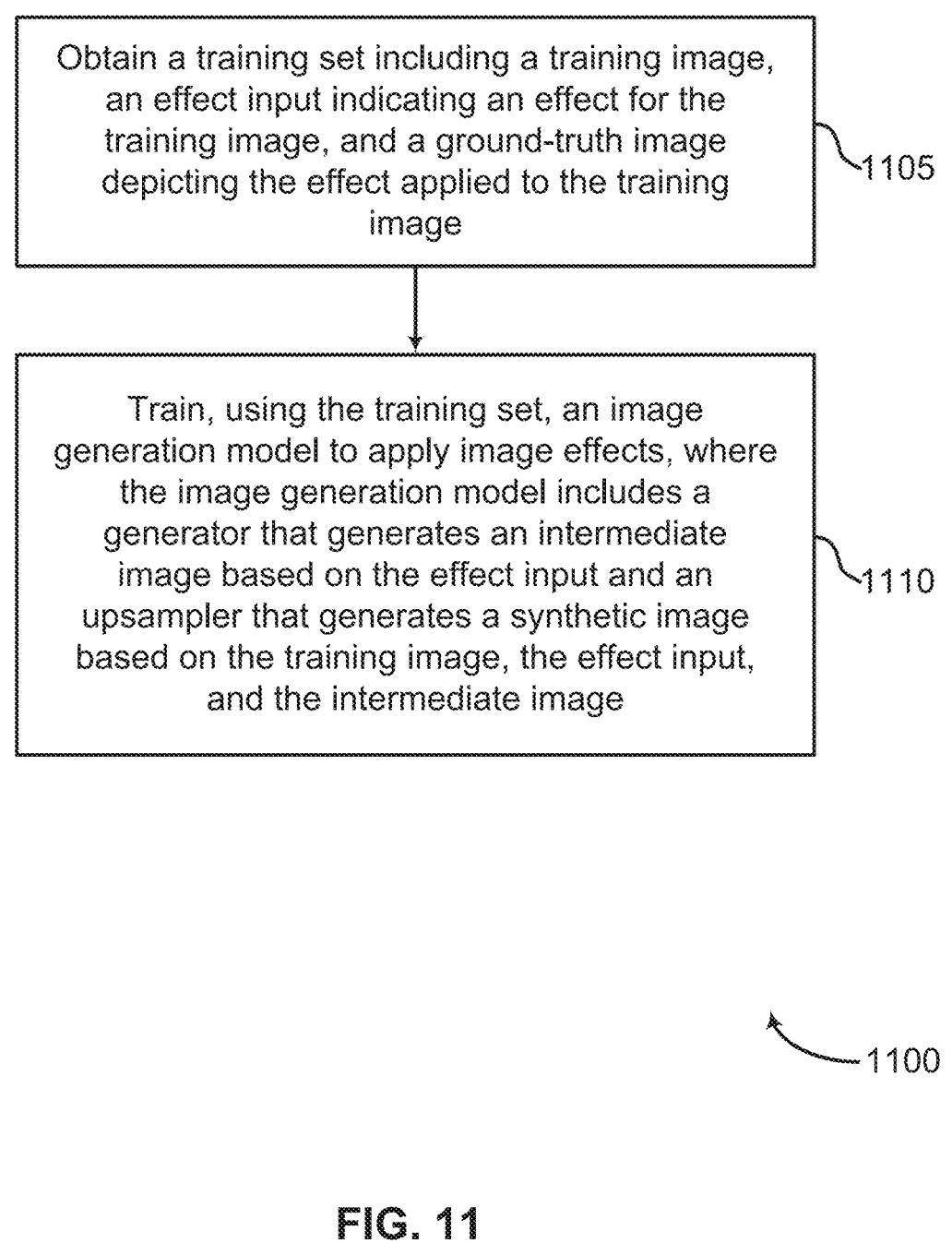

FIG. 11 shows an example of a method for training a machine learning model according to aspects of the present disclosure.

DETAILED DESCRIPTION

Figure 3:
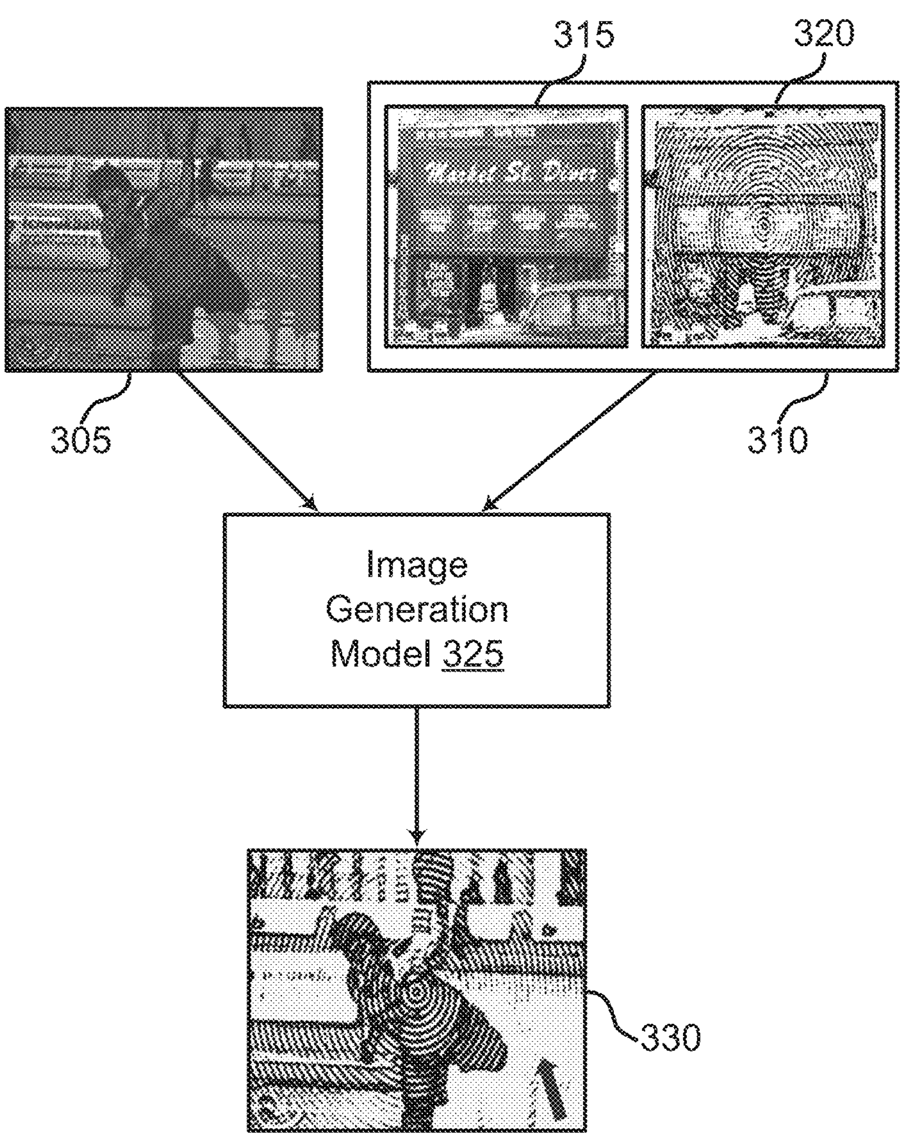
FIG. 3 shows an example of image generation using a reference effect prompt according to aspects of the present disclosure.

Aspects of the present disclosure provide a method and system for image generation. In one aspect, the system receives an input image and a pair of reference effect images to generate a synthetic image depicting content from the input image with the applied style effect from the pair of reference effect images. The system includes an effect encoder trained to generate an effect embedding based on the pair of reference effect images. The system includes an image generator configured to generate a low-resolution intermediate image based on the effect embedding. In some cases, the low-resolution intermediate image depicts the style effect applied to the input image. The system includes an upsampler trained to generate a high-resolution synthetic image based on the input image, the effect embedding, and the low-resolution intermediate image.

A subfield of image processing relates to image generation using style transfer. In some cases, conventional image generation models receive a text prompt describing an image style (or image effect) to generate a synthetic image having the same image style. However, the inherent complexity in image effect generation introduces unavoidable challenges. For example, articulating image effects using text description can be difficult due to the subtle stylistic alterations or a dramatic transformation. In some cases, text prompts describing the image effect can be ineffective in capturing the richness of image effects depicted in an image. In some cases, a user would provide lengthy text descriptions describing the image effect in the image. As a result, the text description of the image effect can be inaccurately generated, and thus, the synthetic image generated based on the text description may inaccurately depict the image effect.

In some cases, conventional image generation models receive a reference image depicting an image effect to generate a synthetic image having a similar image effect depicted in the reference image. For example, a conventional model may receive a reference image as input to extract the image effect and apply the image effect to generate the synthetic image. However, the conventional model is unable to accurately identify and extract the target image effect based on the reference image alone. For example, if a reference image depicts a cartoon woman in a snowfall scene, the conventional model is unable to accurately extract the target image effect. For example, the target photo effect may be the snowfall scene, the cartoon style, or a combination thereof.

In some cases, conventional image generation models are unable to maintain the content and detail from the original image while applying the image effect. In some cases, to reduce computation costs, a conventional model first generates a final low-resolution image and then uses an upsampler model to generate a high-resolution image. However, without taking the input image as conditioning, the conventional model alters the semantics of objects/elements depicted in the input image and generates misaligned pixels to local details from the input image.

In some cases, conventional models employ image-to-image translation to train on specific domains that cannot be generalized to new effects. In some cases, reference-based image stylization transfers an image style from a reference image to the input image. However, complex effect generation using reference-based image stylization can be ambiguous with a single reference. In some cases, instruction-based generative models can apply effects to input images based on text prompts. However, accurately describing complex effects with text is challenging or even impractical.

Accordingly, the present disclosure describes a method and a system that receives a pair of reference effect images depicting an image effect to generate a synthetic image having the same image effect applied to an input image. For example, the pair of reference effect images includes a reference image (without an image effect) and an effect image (with an image effect applied to the reference image. In one aspect, an effect encoder is trained to identify the image effect and to generate an effect embedding based on the pair of reference effect images. For example, the effect embedding includes information about the transformation of the image effect from the pair of reference effect images. In some cases, the effect embedding preserves characteristics and details from the reference effect prompt. In some cases, the effect embedding includes structure preservation and/or color preservation. The effect encoder is trained to adapt detail preservation for various image effects. In some cases, the effect embedding is in the same embedding space (or vector space) as a text embedding. Accordingly, the effect embedding can be used to guide an image generator and an upsampler.

According to some aspects, the upsampler is trained to generate a high-resolution synthetic image based on the input image, the effect embedding, and an intermediate image. In some cases, the image generator is configured to generate the intermediate image using effect embedding as guidance. In one aspect, the intermediate image has a lower resolution than the high-resolution synthetic image. In some cases, the generator and the upsampler sequentially perform the diffusion process at the same timestep. For example, in one diffusion timestep, the generator generates the intermediate image based on the effect embedding, and then, the upsampler takes the intermediate image, the input image, and the effect embedding to generate an upsampled image for the next diffusion timestep. The diffusion process is iteratively performed for a number of timesteps to generate the synthetic image. Accordingly, the image generation model (including the effect encoder, the generator, and the upsampler) generates the synthetic image accurately depicting the image effect applied to the input image while maintaining the content and details from the input image in high resolution.

Figure 12:
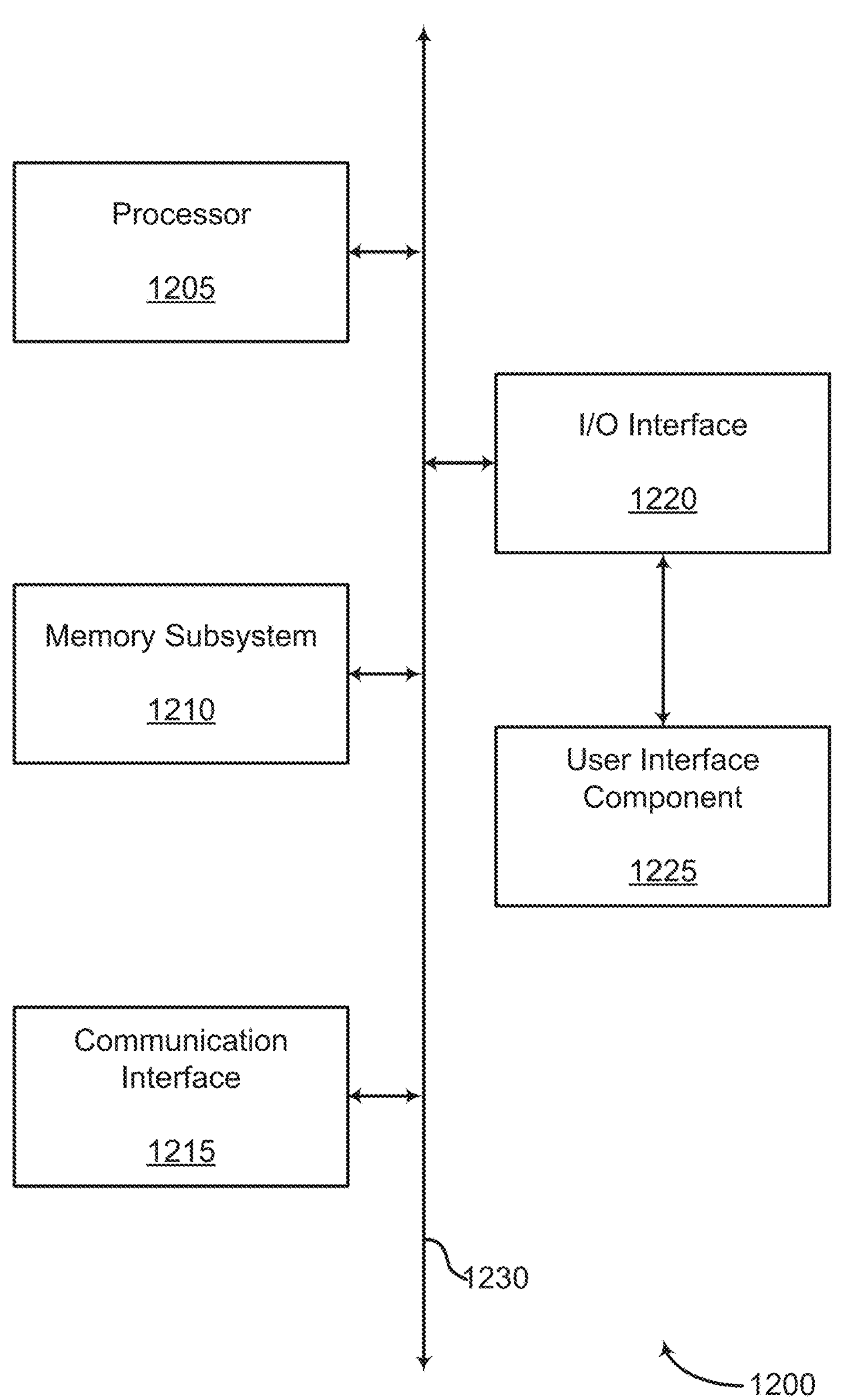
FIG. 12 shows an example of a computing device according to aspects of the present disclosure.

An example system of the inventive concept in image processing is provided with reference to FIGS. 1 and 12. An example application of the inventive concept in image processing is provided with reference to FIGS. 2-4. Details regarding the architecture of an image processing apparatus are provided with reference to FIGS. 6-8. An example of a process for image processing is provided with reference to FIGS. 5 and 9-10. A description of an example training process is provided with reference to FIG. 11.

Embodiments of the present disclosure improve on conventional image generation models by more accurately applying image effects to an input image. For example, an effect encoder is trained to generate effect embedding based on a pair of reference effect images (including a reference image and an effect image having an image effect applied to the reference image). By using the effect embedding to guide the image generation process, the image generation model is able to accurately extract the image effect from the pair of reference effect images and apply the same image effect to the input image.

Furthermore, by generating the synthetic image using a low-resolution intermediate image as input to an upsampler, the contents and details of the input image can be preserved in the synthetic image while maintaining the same image effect. In some cases, the image quality (e.g., the image resolution) of the synthetic image is enhanced while preserving the content and the image effect. By encoding the image effect into a vector space the same as the text embedding space, the effect encoder can be used to augment other text-to-image generation models.

Image Generation

In FIGS. 1-5 and 9-10, a method, apparatus, non-transitory computer readable medium, and system for image processing include obtaining an input image and a reference effect prompt, where the reference effect prompt indicates an image effect for the input image, generating, using a generator of an image generation model, an intermediate image based on the reference effect prompt, where the intermediate image depicts the image effect applied to the input image, and generating, using an upsampler of the image generation model, a synthetic image based on the input image, the reference effect prompt, and the intermediate image, where the synthetic image depicts the image effect applied to the input image and has a higher resolution than the intermediate image.

Some examples of the method, apparatus, non-transitory computer readable medium, and system further include generating an effect embedding based on the reference effect prompt. In some cases, the effect embedding represents the image effect in a vector space. Some examples of the method, apparatus, non-transitory computer readable medium, and system further include obtaining a reference image and an effect image. In some cases, the effect image depicts the image effect applied to the reference image.

Some examples of the method, apparatus, non-transitory computer readable medium, and system further include generating a plurality of intermediate images corresponding to a plurality of diffusion steps. Some examples of the method, apparatus, non-transitory computer readable medium, and system further include generating a plurality of upsampled images. In some cases, each of the plurality of intermediate images is generated based on a corresponding upsampled image of the plurality of upsampled images. Some examples of the method, apparatus, non-transitory computer readable medium, and system further include downsampling each of the plurality of upsampled images to obtain a plurality of downsampled images. In some cases, each of the plurality of intermediate images is generated based on a corresponding down-sampled image of the plurality of downsampled images.

Some examples of the method, apparatus, non-transitory computer readable medium, and system further include adding noise to the input image to obtain a high-resolution noise image. In some cases, the synthetic image is generated based on the high-resolution noise image. Some examples of the method, apparatus, non-transitory computer readable medium, and system further include obtaining an additional reference effect prompt indicating an additional image effect. In some cases, the synthetic image depicts the image effect and the additional image effect applied to the input image.

In some aspects, the image generation model is trained to apply image effects based on a training set including a training image, a effect prompt indicating a effect for the training image, and a ground-truth image depicting the effect applied to the training image.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 6.

Referring to FIG. 1, user 100 provides an input image and a reference effect prompt to image processing apparatus 110 via user device 105 and cloud 115 to generate a synthetic image. For example, the input image depicts a boy throwing a ball. In some cases, the reference effect prompt includes a reference image depicting a storefront and an effect image having an image effect applied to the reference image. For example, the image effect is a green line engraving style with nested circles. In some embodiments, image processing apparatus 110 includes an effect encoder trained to generate an effect embedding based on the reference effect prompt. Then, an image generation model generates an intermediate image (or low-resolution intermediate image) based on the effect embedding. In some embodiments, image processing apparatus 110 includes an upsampler trained to generate a synthetic image based on the input image, the effect embedding, and the intermediate image. For example, the synthetic image depicts the boy throwing the ball having the identical image effect, which is the green line engraving with nested circles. Image processing apparatus 110 displays the synthetic image to user 100 via user device 105 and cloud 115.

User device 105 may be a personal computer, laptop computer, mainframe computer, palmtop computer, personal assistant, mobile device, or any other suitable processing apparatus. In some examples, user device 105 includes software that incorporates an image processing application. In some examples, the image processing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, a user interface may be a graphical user interface (GUI). In some examples, a user interface may be represented in code in which the code is sent to the user device 105 and rendered locally by a browser. The process of using the image processing apparatus 110 is described with reference to FIG. 2.

Image processing apparatus 110 is an example of, or includes aspects of, the corresponding element described with reference to FIG. 6. According to some aspects, image processing apparatus 110 includes a computer implemented network comprising a machine learning model and an image generation model. In one aspect, the image generation model includes an effect encoder, a generator, an upsampler, and a downsampler. Image processing apparatus 110 further includes a processor unit, a memory unit, an I/O module, a user interface, a data preparation component, and a training component. In some embodiments, image processing apparatus 110 further includes a communication interface, user interface components, and a bus as described with reference to FIG. 12. Additionally or alternatively, image processing apparatus 110 communicates with user device 105 and database 120 via cloud 115. Further detail regarding the operation of image processing apparatus 110 is described with reference to FIG. 2.

In some cases, image processing apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

According to some aspects, database 120 stores training data (or training set) including a training image, a effect prompt, and a ground-truth image. Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In some cases, the database controller may operate automatically without user interaction.

FIG. 2 shows an example of a method 200 for image generation using image effect prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, a user (e.g., the user described with reference to FIG. 1) provides an input image and a pair of reference images (sometimes referred to as the reference effect prompt) to the image processing apparatus (e.g., the image processing apparatus described with reference to FIGS. 1 and 6). In some cases, the pair of reference images includes an original image and a modified image having an image effect applied to the original image. In some aspects, the image processing apparatus includes an effect encoder that generates an effect embedding based on the pair of reference images. The effect embedding is used as input to an image generator and an upsampler to generate the synthetic image. For example, the image generator receives the effect embedding as guidance to guide the image generation process and to generate an intermediate image depicting the applied image effect to the input image. In some cases, the intermediate image is a low-resolution image. Then, the upsampler receives the input image, the effect embedding, and the intermediate image to generate the synthetic image that depicts the image effect applied to the input image. In some cases, the synthetic image has a higher resolution than the intermediate image.

At operation 205, the system provides an input image and a reference effect prompt. In some cases, the operations of this step refer to, or may be performed by, a user as described with reference to FIG. 1. For example, the user provides the input image and a pair of reference images to the image generation apparatus via a user interface provided by the image processing apparatus on a user device (e.g., the user device described with reference to FIG. 1). In some cases, the pair of reference images include an original image and a modified image having an image effect applied to the original image. In some cases, the contents depicted in the input image and the original image are different. For example, the input image may depict a person, and the original image may depict a storefront.

At operation 210, the system generates an effect embedding. In some cases, the operations of this step refer to, or may be performed by, an image processing apparatus as described with reference to FIGS. 1 and 6. In some cases, the operations of this step refer to, or may be performed by, an effect encoder as described with reference to FIGS. 6, 7, and 10. In some embodiments, the effect encoder generates the effect embedding based on the reference effect prompt. For example, the effect embedding includes information about the image effect transformation from the original image to the modified image. In some cases, the effect embedding is generated in a text embedding space. For example, a text embedding of a text prompt can be concatenated with the effect embedding. In some cases, the effect embedding is generated in an image space. For example, an image embedding of an image can be concatenated with the effect embedding. In some cases, the effect embedding is generated in a multi-modal space. For example, the effect embedding can be combined with a text embedding, an image embedding, a style embedding, or a combination thereof.

At operation 215, the system generates a synthetic image. In some cases, the operations of this step refer to, or may be performed by, an image processing apparatus as described with reference to FIGS. 1 and 6. In some cases, the operations of this step refer to, or may be performed by, an image generation model as described with reference to FIGS. 3, 4, 6, and 10. In some cases, an image generation model generates the synthetic image based on the input image, the effect embedding, and a low-resolution intermediate image. In some cases, the synthetic image depicts the image effect applied to the input image. In some cases, the content and detail from the input image are preserved in the synthetic image. Further detail on the image generation is described with reference to FIGS. 7 and 10.

At operation 220, the system displays the synthetic image. In some cases, the operations of this step refer to, or may be performed by, an image processing apparatus as described with reference to FIGS. 1 and 6. For example, the synthetic image is returned and displayed to the user via a user interface provided by the image processing apparatus on the user device.

FIG. 3 shows an example of image generation using a reference effect prompt according to aspects of the present disclosure. The example shown includes image generation system 300, input image 305, reference effect prompt 310, image generation model 325, and synthetic image 330. In one aspect, reference effect prompt 310 includes reference image 315 and effect image 320. In some cases, for example, image generation system 300 is implemented in a user interface.

Referring to FIG. 3, image generation model 325 receives input image 305 and reference effect prompt 310 to generate synthetic image 330. For example, input image 305 depicts a boy standing on one foot and throwing a ball. In one aspect, reference effect prompt 310 includes reference image 315 and effect image 320. For example, reference image 315 depicts a storefront, and effect image 320 depicts an image effect applied to the storefront depicted in reference image 315. In some cases, for example, the image effect is green line engraving style with nested circles. Image generation model 325 generates an effect embedding based on reference effect prompt 310. Effect embedding is an example of, or includes aspects of, the corresponding element described with reference to FIGS. 7 and 10.

Image generation model 325 generates synthetic image 330 based on input image 305 and the effect embedding. In some cases, synthetic image 330 depicts the image effect applied to input image 305. For example, synthetic image 330 depicts the boy standing on one foot and throwing a ball with an image effect of green line engraving style with nested circles.

In some cases, conventional image generation models are incapable of and not trained to receive reference effect prompt 310 as input to generate an output image. In some cases, the conventional image generation models take a text prompt that describes the image effect as input. For example, the conventional models take input image 305 and a text prompt to generate a conventional synthetic image. For example, the text prompt may state "green line engraving style with nested circles." However, the content and detail of a conventional synthetic image can be altered. For example, the conventional synthetic image may depict the input image 305 having the green color filling the entire image and circles in one or more regions of input image 305. Conventional image generation models are unable to accurately identify and extract the image effect depicted in effect image 320.

Image generation system 300 is an example of, or includes aspects of, the corresponding element described with reference to FIG. 4. Input image 305 is an example of, or includes aspects of, the corresponding element described with reference to FIGS. 4, 7, and 10. Reference effect prompt 310 is an example of, or includes aspects of, the corresponding element described with reference to FIGS. 7 and 10.

Reference image 315 is an example of, or includes aspects of, the corresponding element described with reference to FIGS. 7 and 10. Effect image 320 is an example of, or includes aspects of, the corresponding element described with reference to FIGS. 7 and 10. Image generation model 325 is an example of, or includes aspects of, the corresponding element described with reference to FIGS. 4, 6, and 10. Synthetic image 330 is an example of, or includes aspects of, the corresponding element described with reference to FIGS. 7 and 10.

Figure 4:
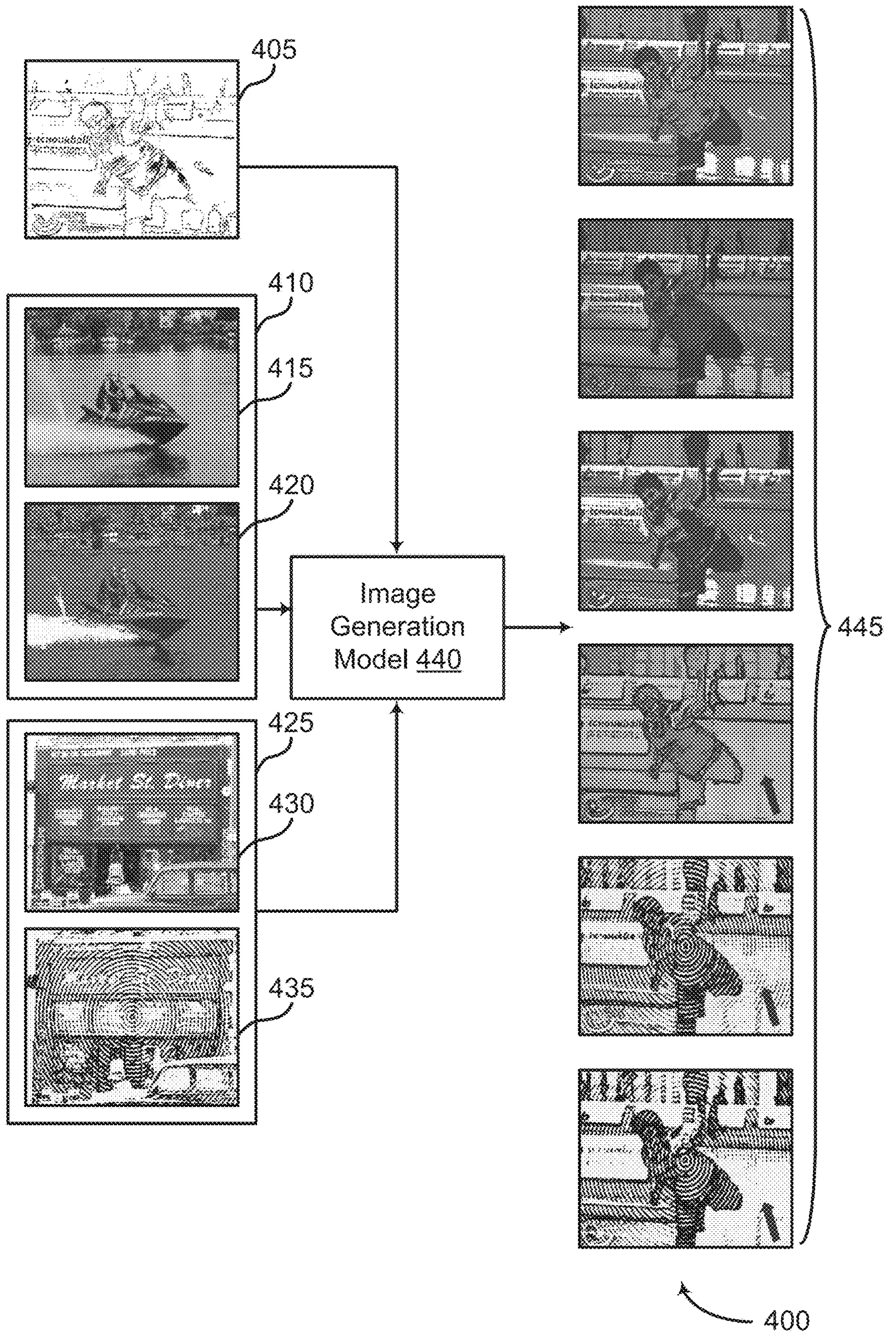
FIG. 4 shows an example of image generation using effect embedding interpolation according to aspects of the present disclosure.

FIG. 4 shows an example of image generation using effect embedding interpolation according to aspects of the present disclosure. The example shown includes image generation system 400, input image 405, first reference effect prompt 410, second reference effect prompt 425, image generation model 440, and synthetic images 445. In one aspect, first reference effect prompt 410 includes first reference image 415 and first effect image 420. In one aspect, second reference effect prompt 425 includes second reference image 430 and second effect image 435. In some cases, for example, image generation system 400 is implemented in a user interface.

Referring to FIG. 4, image generation model 440 receives two reference effect prompts (e.g., first reference effect prompt 410 and second reference effect prompt 425) to generate a plurality of images having a spectrum of image effects between the first image effect and the second image effect. For example, first reference effect prompt 410 includes first reference image 415 and first effect image 420 having a first image effect applied to first reference image 415. In some cases, for example, the first image effect is a red-and-blue halftone printing effect. For example, second reference effect prompt 425 includes second reference image 430 and second effect image 435 having a second image effect applied to second reference image 430. In some cases, for example, the second image effect is a green line engraving style with nested circles.

In some embodiments, the effect encoder of image generation model 440 generates a first effect embedding and a second effect embedding based on first reference effect prompt 410 and second reference effect prompt 425, respectively. Image generation model 440 applies linear interpolation to generate synthetic images 445. For example, the linear interpolation is represented as $(1-m)J(A1, A1')+mJ(A2, A2')$, where $J(A1, A1')$ represents the first effect embedding, $J(A2, A2')$ represents the second effect embedding, and m represents a parameter. For example, as m increases to 1.0, the synthetic image depicts the image effect applied to input image 405 the same as the second image effect. Conversely, as m decreases to 0, the synthetic image depicts the image effect applied to input image 405 the same as the first image effect.

Image generation system 400 is an example of, or includes aspects of, the corresponding element described with reference to FIG. 3. Input image 405 is an example of, or includes aspects of, the corresponding element described with reference to FIGS. 3, 7, and 10. Image generation model 440 is an example of, or includes aspects of, the corresponding element described with reference to FIGS. 3, 6, and 10.

Figure 5:
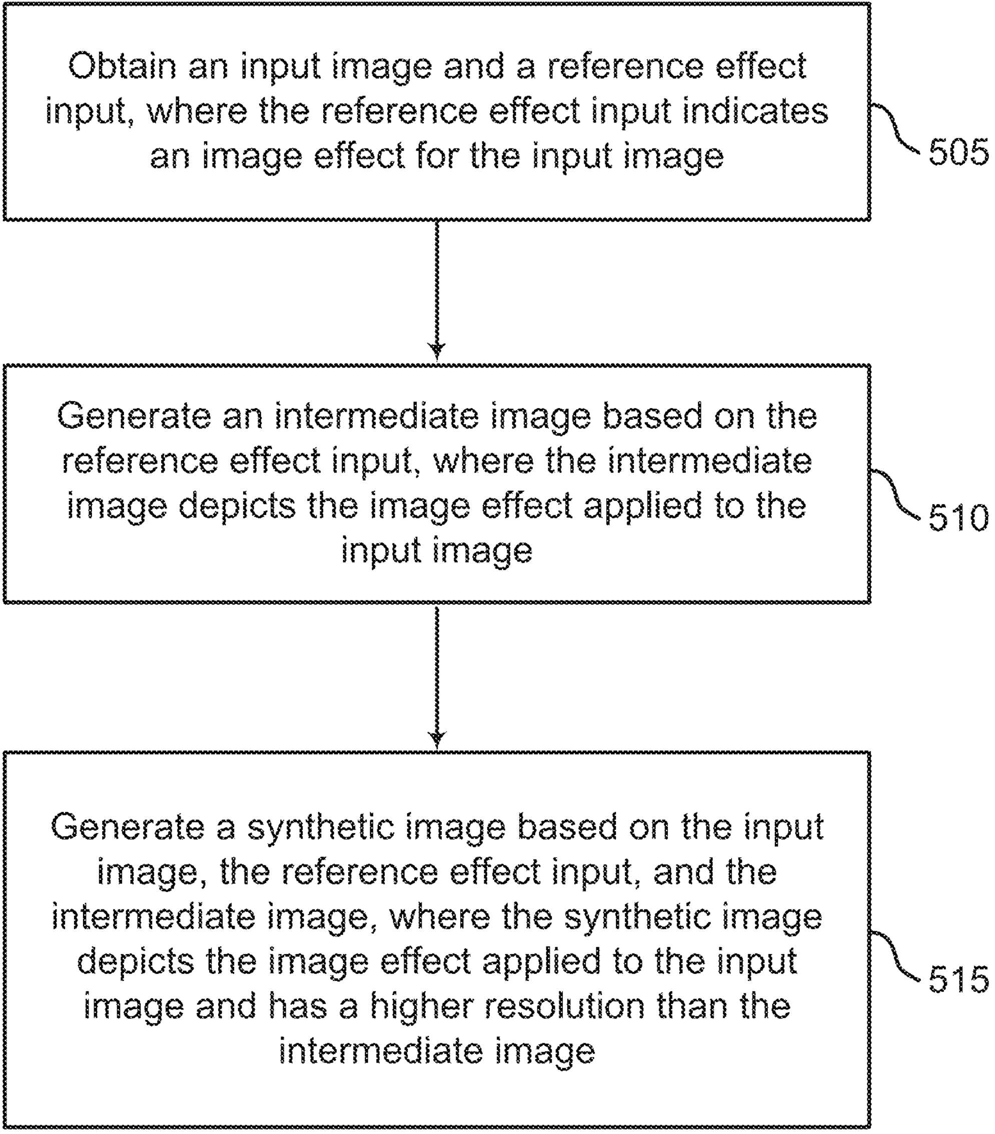
FIG. 5 shows an example of a method for generating a synthetic image based on a reference effect prompt according to aspects of the present disclosure.

FIG. 5 shows an example of a method 500 for generating a synthetic image based on a reference effect prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system obtains an input image and a reference effect prompt, where the reference effect prompt indicates an image effect for the input image. In some cases, the operations of this step refer to, or may be performed by, an image generation model as described with reference to FIGS. 3, 4, 6, and 10. For example, the reference effect prompt includes a reference image (without any image effect) and an effect image (with an image effect applied to the reference image.

At operation 510, the system generates an intermediate image based on the reference effect prompt, where the intermediate image depicts the image effect applied to the input image. In some cases, the operations of this step refer to, or may be performed by, a generator as described with reference to FIGS. 6, 7, and 10. In some cases, the intermediate image is generated based on an effect embedding of the reference effect prompt. In some cases, the intermediate image is a low-resolution image generated based on the input image and the effect embedding.

In some cases, an effect embedding may be represented as a vector form in a vector space. Vector space provides a framework for representing and manipulating data (in the form of vectors), computing distances between vectors, and transforming input data for complex relationships. The dimensionality of the vector space is determined based on the number of features in the feature vector. For example, if each data point has three features (e.g., length, width, and height), the vector space is three-dimensional. In some cases, a joint vector space includes a high-dimensional vector space and a low-dimensional vector space. In some cases, an image embedding is in a high-dimensional vector space and a text embedding is in a low-dimensional vector space. In some cases, the effect embedding is in the same vector space as the text embedding.

At operation 515, the system generates a synthetic image based on the input image, the reference effect prompt, and the intermediate image, where the synthetic image depicts the image effect applied to the input image and has a higher resolution than the intermediate image. In some cases, the operations of this step refer to, or may be performed by, an upsampler as described with reference to FIGS. 6, 7, and 10. In some cases, the synthetic image is generated based on the input image, the effect embedding, and the intermediate image. In some cases, the synthetic image has a higher resolution than the intermediate image.

System Architecture

In FIGS. 6-8 and 12, an apparatus and system for image processing include at least one processor, at least one memory storing instructions executable by the at least one processor, and an image generation model comprising parameters stored in the at least one memory, where the image generation model includes a generator that generates an intermediate image based on a reference effect prompt that indicates an image effect for an input image and an upsampler trained to generate a synthetic image based on the input image, the reference effect prompt, and the intermediate image, where the synthetic image depicts the image effect applied to the input image and has a higher resolution than the intermediate image.

Some examples of the apparatus and system further include an effect encoder trained to generate an effect embedding based on the reference effect prompt. In some aspects, the generator and the upsampler comprise diffusion models. In some aspects, the intermediate image is generated based on an output of the upsampler. Some examples of the apparatus and system further include a downsampler is configured to downsample the output of the upsampler to obtain a downsampled image, where the intermediate image is generated based on the downsampled image.

Figure 6:
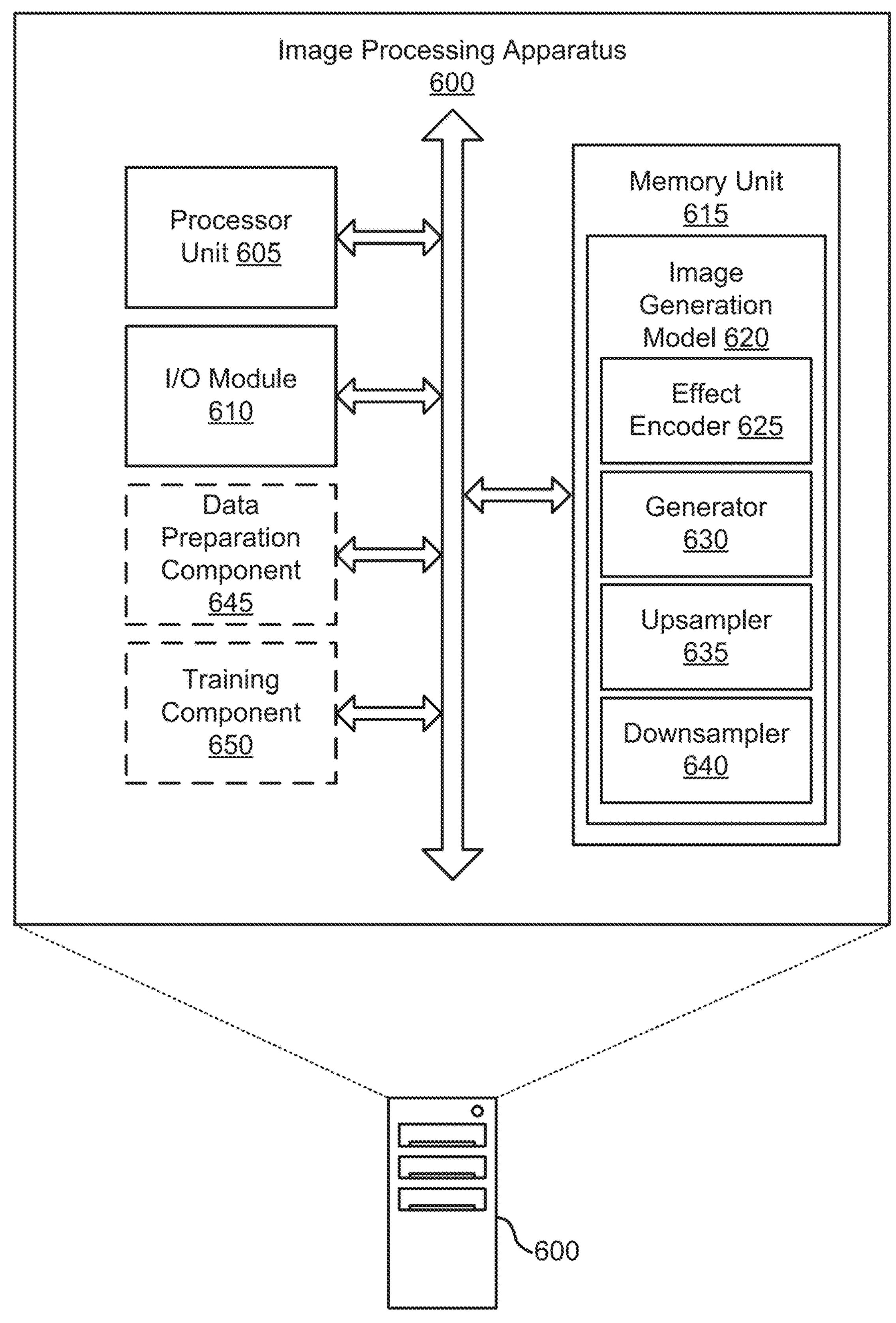
FIG. 6 shows an example of an image processing apparatus according to aspects of the present disclosure.

FIG. 6 shows an example of an image processing apparatus 600 according to aspects of the present disclosure. The example shown includes image processing apparatus 600, processor unit 605, I/O module 610, memory unit 615, data preparation component 645, and training component 650. In one aspect, memory unit 615 includes image generation model 620. In one aspect, image generation model 620 includes effect encoder 625, generator 630, upsampler 635, and downsampler 640.

According to some embodiments of the present disclosure, image processing apparatus 600 includes a computer-implemented artificial neural network (ANN). An ANN is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted. Image processing apparatus 600 is an example of, or includes aspects of, the corresponding element described with reference to FIG. 1.

Processor unit 605 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 605 is configured to operate a memory array using a memory controller. In other cases, a memory controller is integrated into the processor. In some cases, processor unit 605 is configured to execute computer-readable instructions stored in a memory to perform various functions. In some embodiments, processor unit 605 includes special-purpose components for modem processing, baseband processing, digital signal processing, or transmission processing. Processor unit 605 is an example of, or includes aspects of, the processor described with reference to FIG. 12.

I/O module 610 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In some cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 610 includes a user interface. A user interface may enable a user to interact with a device. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna. I/O module 610 is an example of, or includes aspects of, the I/O interface described with reference to FIG. 12.

Examples of memory unit 615 include random access memory (RAM), read-only memory (ROM), or a hard disk. Examples of memory unit 615 include solid-state memory and a hard disk drive. In some examples, memory unit 615 is used to store computer-readable, computer-executable software including instructions that, when executed, cause a processor to perform various functions described herein.

In some cases, memory unit 615 includes, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within memory unit 615 store information in the form of a logical state.

In one aspect, memory unit 615 includes a machine learning model. In one aspect, memory unit 615 includes image generation model 620. In one aspect, image generation model 620 includes effect encoder 625, generator 630, upsampler 635, and downsampler 640. Memory unit 615 is an example of, or includes aspects of, the memory subsystem described with reference to FIG. 12.

In some cases, a machine learning model is a computational algorithm, model, or system designed to recognize patterns, make predictions, or perform a specific task (for example, image processing) without being explicitly programmed. According to some aspects, the machine learning model is implemented as software stored in memory unit 615 and executable by processor unit 605, as firmware, as one or more hardware circuits, or as a combination thereof.

According to some embodiments of the present disclosure, the machine learning model includes an ANN, which is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted.

During the training process, the one or more node weights are adjusted to increase the accuracy of the result (e.g., by minimizing a loss function that corresponds in some way to the difference between the current result and the target result). The weight of an edge increases or decreases the strength of the signal transmitted between nodes. In some cases, nodes have a threshold below which a signal is not transmitted. In some examples, the nodes are aggregated into layers. Different layers perform different transformations on the corresponding inputs. The initial layer is known as the input layer and the last layer is known as the output layer. In some cases, signals traverse certain layers multiple times.

According to some embodiments, the machine learning model includes a computer-implemented convolutional neural network (CNN). CNN is a class of neural networks commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (e.g., the receptive field). During a forward pass of the CNN, filters at each layer may be convolved across the input volume, computing the dot product between the filter and the input. During the training process, the filters may be modified so that the filters activate when the filters detect a particular feature within the input.

In one aspect, machine learning model includes machine learning parameters. Machine learning parameters, also known as model parameters or weights, are variables that provide behaviors and characteristics of the machine learning model. Machine learning parameters can be learned or estimated from training data and are used to make predictions or perform tasks based on learned patterns and relationships in the data.

Machine learning parameters are adjusted during a training process to minimize a loss function or maximize a performance metric. The goal of the training process is to find optimal values for the parameters that enables the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

According to some embodiments, the machine learning model includes a computer-implemented recurrent neural network (RNN). An RNN is a class of ANN in which connections between nodes form a directed graph along an ordered (e.g., a temporal) sequence. This enables an RNN to model temporally dynamic behavior such as predicting what element should come next in a sequence. Thus, an RNN is suitable for tasks that involve ordered sequences such as text recognition (where words are ordered in a sentence). In some cases, an RNN includes one or more finite impulse recurrent networks (characterized by nodes forming a directed acyclic graph), one or more infinite impulse recurrent networks (characterized by nodes forming a directed cyclic graph), or a combination thereof.

According to some embodiments, the machine learning model includes a transformer (or a transformer model, or a transformer network), where the transformer is a type of neural network model used for natural language processing tasks. A transformer network transforms one sequence into another sequence using an encoder and a decoder. The encoder and decoder include modules that can be stacked on top of each other multiple times. The modules comprise multi-head attention and feed-forward layers. The inputs and outputs (target sentences) are first embedded into an n-dimensional space. Positional encoding of the different words (e.g., give each word/part in a sequence a relative position since the sequence depends on the order of its elements) is added to the embedded representation (n-dimensional vector) of each word. In some examples, a transformer network includes an attention mechanism, where the attention looks at an input sequence and decides at each step which other parts of the sequence are important. The attention mechanism involves a query, keys, and values denoted by Q, K, and V, respectively. Q is a matrix that contains the query (vector representation of one word in the sequence), K are the keys (vector representations of the words in the sequence) and V are the values, which are again the vector representations of the words in the sequence. For the encoder and decoder, multi-head attention modules, V consists of the same word sequence as Q. However, for the attention module that takes into account the encoder and the decoder sequences, V is different from the sequence represented by Q. In some cases, values in V are multiplied and summed with some attention-weights a.

In the machine learning field, an attention mechanism (e.g., implemented in one or more ANNs) is a method of placing differing levels of importance on different elements of an input. Calculating attention may involve three basic steps. First, a similarity between the query and key vectors obtained from the input is computed to generate attention weights. Similarity functions used for this process can include the dot product, splice, detector, and the like. Next, a softmax function is used to normalize the attention weights. Finally, the attention weights are weighed together with the corresponding values. In the context of an attention network, the key and value are vectors or matrices that are used to represent the input data. The key is used to determine which parts of the input the attention mechanism should focus on, while the value is used to represent the actual data being processed.

An attention mechanism is a key component in some ANN architectures, particularly ANNs employed in natural language processing (NLP) and sequence-to-sequence tasks, that enables an ANN to focus on different parts of an input sequence when making predictions or generating output. Some sequence models (such as RNNs) process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering the relevance of each input element with respect to the current state of the ANN.

The term "self-attention" refers to a machine learning model in which representations of the input interact with each other to determine attention weights for the input. Self-attention can be distinguished from other attention models because the attention weights are determined at least in part by the input.

In one aspect, image generation model 620 includes effect encoder 625, generator 630, upsampler 635, and downsampler 640. In some aspects, image generation model 620 is implemented as software stored in memory unit 615 and executable by processor unit 605, as firmware, as one or more hardware circuits, or as a combination thereof. Image generation model 620 is an example of, or includes aspects of, the corresponding element described with reference to FIGS. 3, 4, and 10.

According to some aspects, image generation model 620 obtains an input image and a reference effect prompt, where the reference effect prompt indicates an image effect for the input image. In some examples, image generation model 620 obtains a reference image and an effect image, where the effect image depicts the image effect applied to the reference image. In some examples, image generation model 620 adds noise to the input image to obtain a high-resolution noise image, where the synthetic image is generated based on the high-resolution noise image.

In some aspects, image generation model 620 obtains an additional reference effect prompt indicating an additional image effect, where the synthetic image depicts the image effect and the additional image effect applied to the input image. In some aspects, the image generation model 620 is trained to apply image effects based on a training set including a training image, an effect prompt indicating an effect for the training image, and a ground-truth image depicting the effect applied to the training image.

According to some aspects, image generation model 620 comprises parameters stored in the at least one memory, where the image generation model 620 includes a generator 630 that generates an intermediate image based on a reference effect prompt that indicates an image effect for an input image and an upsampler 635 trained to generate a synthetic image based on the input image, the reference effect prompt, and the intermediate image. In some cases, the synthetic image depicts the image effect applied to the input image and has a higher resolution than the intermediate image.

According to some aspects, effect encoder 625 is implemented as software stored in memory unit 615 and executable by processor unit 605, as firmware, as one or more hardware circuits, or as a combination thereof. According to some aspects, effect encoder 625 generates an effect embedding based on the reference effect prompt, where the effect embedding represents the image effect in a vector space. According to some aspects, effect encoder 625 is trained to generate an effect embedding based on the reference effect prompt. Effect encoder 625 is an example of, or includes aspects of, the corresponding element described with reference to FIGS. 7 and 10.

According to some aspects, generator 630 is implemented as software stored in memory unit 615 and executable by processor unit 605, as firmware, as one or more hardware circuits, or as a combination thereof. According to some aspects, generator 630 generates an intermediate image based on the reference effect prompt, where the intermediate image depicts the image effect applied to the input image. In some examples, generator 630 generates a set of intermediate images corresponding to a set of diffusion steps. In some aspects, the generator 630 includes a diffusion model. In some aspects, the intermediate image is generated based on the output of the upsampler 635. Generator 630 is an example of, or includes aspects of, the corresponding element described with reference to FIGS. 7 and 10.

According to some aspects, upsampler 635 is implemented as software stored in memory unit 615 and executable by processor unit 605, as firmware, as one or more hardware circuits, or as a combination thereof. According to some aspects, upsampler 635 generates a synthetic image based on the input image, the reference effect prompt, and the intermediate image, where the synthetic image depicts the image effect applied to the input image and has a higher resolution than the intermediate image. In some examples, upsampler 635 generates a set of upsampled images, where each of the set of intermediate images is generated based on a corresponding upsampled image of the set of upsampled images. In some cases, upsampler 635 includes a diffusion model. Upsampler 635 is an example of, or includes aspects of, the corresponding element described with reference to FIGS. 7 and 10.

According to some aspects, downsampler 640 is implemented as software stored in memory unit 615 and executable by processor unit 605, as firmware, as one or more hardware circuits, or as a combination thereof. According to some aspects, downsampler 640 downsamples each of the set of upsampled images to obtain a set of downsampled images, where each of the set of intermediate images is generated based on a corresponding down-sampled image of the set of downsampled images. According to some aspects, downsampler 640 is configured to downsample the output of the upsampler 635 to obtain a downsampled image, where the intermediate image is generated based on the downsampled image.

According to some aspects, data preparation component 645 is implemented as software stored in memory unit 615 and executable by processor unit 605, as firmware, as one or more hardware circuits, or as a combination thereof. According to some embodiments, data preparation component 645 is implemented as software stored in a memory unit and executable by a processor in the processor unit of a separate computing device, as firmware in the separate computing device, as one or more hardware circuits of the separate computing device, or as a combination thereof. In some examples, data preparation component 645 is part of another apparatus other than image processing apparatus 600 and communicates with the image processing apparatus 600. In some examples, data preparation component 645 is part of image processing apparatus 600.

According to some aspects, data preparation component 645 applies the effect to the training image to obtain the ground-truth image. In some examples, data preparation component 645 obtains a reference image. In some examples, data preparation component 645 applies the effect to the reference image to obtain an effect image, where the effect prompt includes the reference image and the effect image.

According to some aspects, training component 650 is implemented as software stored in memory unit 615 and executable by processor unit 605, as firmware, as one or more hardware circuits, or as a combination thereof. According to some embodiments, training component 650 is implemented as software stored in a memory unit and executable by a processor in the processor unit of a separate computing device, as firmware in the separate computing device, as one or more hardware circuits of the separate computing device, or as a combination thereof. In some examples, training component 650 is part of another apparatus other than image processing apparatus 600 and communicates with the image processing apparatus 600. In some examples, training component 650 is part of image processing apparatus 600.

According to some aspects, training component 650 obtains a training set including a training image, an effect prompt indicating an effect for the training image, and a ground-truth image depicting the effect applied to the training image. In some examples, training component 650 trains, using the training set, an image generation model 620 to apply image effects, where the image generation model 620 includes a generator 630 that generates an intermediate image based on the effect prompt and an upsampler 635 that generates a synthetic image based on the training image, the effect prompt, and the intermediate image.

In some aspects, training component 650 computes an upsampling loss. In some examples, training component 650 updates parameters of the upsampler 635 based on the upsampling loss. In some examples, training component 650 freezes the generator 630 while training the upsampler 635. In some examples, training component 650 computes an effect loss. In some examples, training component 650 updates parameters of an effect encoder 625 of the image generation model 620 based on the effect loss.

Figure 7:
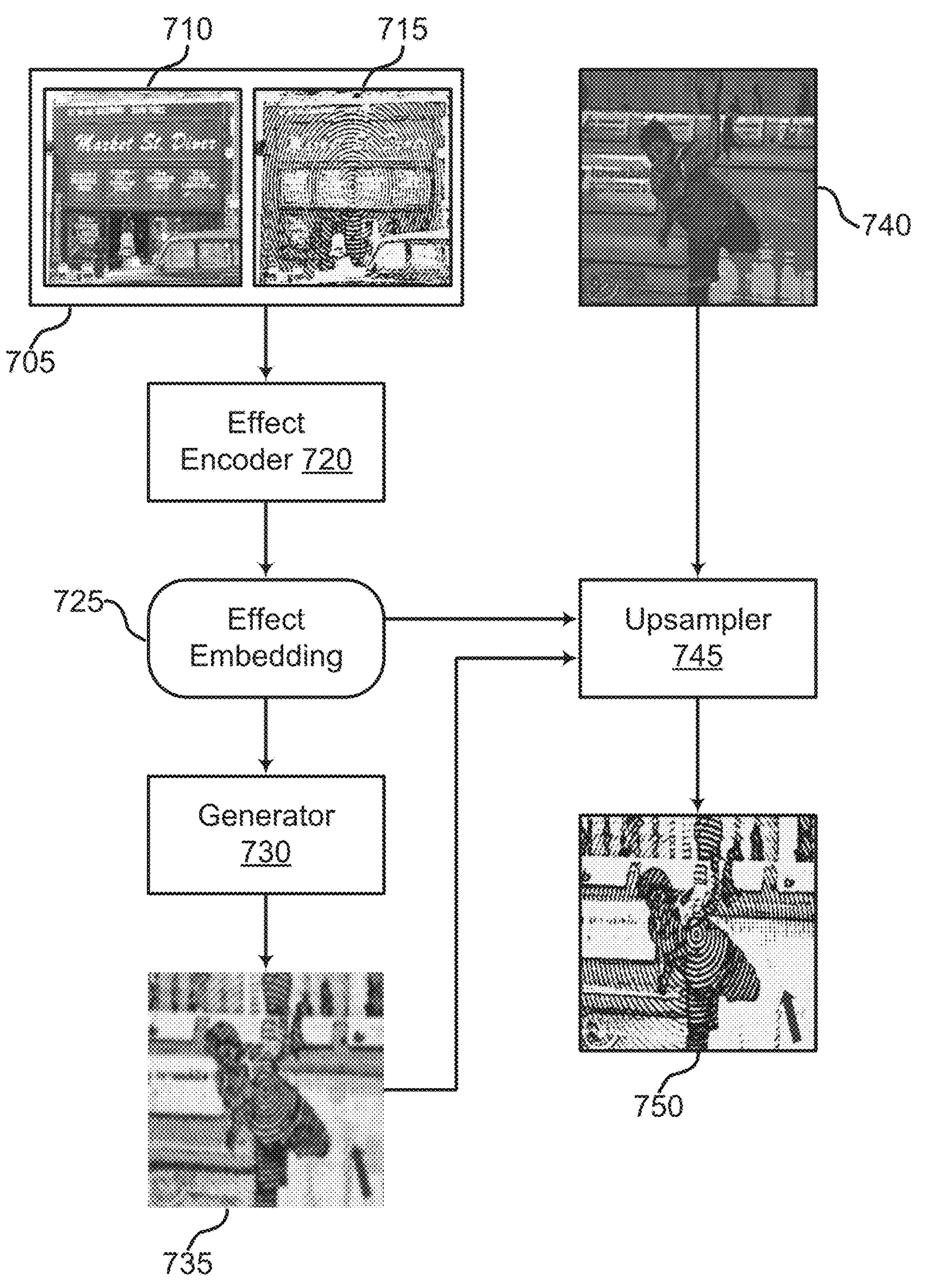
FIG. 7 shows an example of a machine learning model according to aspects of the present disclosure.

FIG. 7 shows an example of a machine learning model according to aspects of the present disclosure. The example shown includes machine learning system 700, reference effect prompt 705, effect encoder 720, effect embedding 725, generator 730, intermediate image 735, input image 740, upsampler 745, and synthetic image 750. In one aspect, reference effect prompt 705 includes reference image 710 and effect image 715.

Referring to FIG. 7, machine learning system 700 receives reference effect prompt 705 and input image 740 to generate synthetic image 750. For example, reference effect prompt 705 includes reference image 710 and effect image 715. Reference image 710 and effect image 715 are input into effect encoder 720 to generate effect embedding 725. In some aspects, effect embedding 725 includes information about the image effect transformation from reference image 710 to effect image 715. For example, as shown in FIG. 7, the image effect transformation shows a green line engraving style with nested circles. In some cases, the image effect transformation further includes information such as pixel arrangements, gradient, sharpness, etc.

In some embodiments, generator 730 uses effect embedding 725 as guidance to guide the image generation process to generate intermediate image 735. For example, generator 730 includes a diffusion model. In some cases, generator 730 takes a low-resolution noisy version of input image 740 to generate intermediate image 735. In some cases, intermediate image 735 is a low-resolution image. In some cases, intermediate image 735 depicts the image effect applied to input image 740 in low resolution. For example, input image 740 depicts a boy throwing a ball, and intermediate image 735 depicts the boy throwing the ball with an image effect of green line engraving style with nested circles.

In some embodiments, upsampler 745 receives input image 740, effect embedding 725, and intermediate image 735 to generate synthetic image 750. For example, upsampler 745 includes a diffusion model. In some embodiments, a noisy image is obtained from input image 740 by adding noise to input image 740. Intermediate image 735 is upsampled to generate an upsampled intermediate image. Then, the noisy image is concatenated with the upsampled intermediate image. Upsampler 745 generates synthetic image 750 based on the concatenated images and effect embedding 725. In some cases, synthetic image 750 has a higher resolution than intermediate image 735. Further detail on the diffusion process of generator 730 and upsampler 745 of an image generation model is described with reference to FIG. 10.

In some aspects, upsampler 745 uses a diffusion process to progressively and iteratively transform noise (or a noisy image) into a high-resolution image. In some cases, the network within upsampler 745 is trained to enhance details through iterative diffusion-based refinement. In some cases, upsampler 745 includes an input-guided diffusion-based upsampler that upscales results into higher resolution at each timestep and maintains accurate input content details.

Reference effect prompt 705 is an example of, or includes aspects of, the corresponding element described with reference to FIGS. 3 and 10. Reference image 710 is an example of, or includes aspects of, the corresponding element described with reference to FIGS. 3 and 10. Effect image 715 is an example of, or includes aspects of, the corresponding element described with reference to FIGS. 3 and 10.

Effect encoder 720 is an example of, or includes aspects of, the corresponding element described with reference to FIGS. 6 and 10. Effect embedding 725 is an example of, or includes aspects of, the corresponding element described with reference to FIG. 10. Generator 730 is an example of, or includes aspects of, the corresponding element described with reference to FIGS. 6 and 10.

Intermediate image 735 is an example of, or includes aspects of, the corresponding element described with reference to FIG. 10. Input image 740 is an example of, or includes aspects of, the corresponding element described with reference to FIGS. 3, 4, and 10. Upsampler 745 is an example of, or includes aspects of, the corresponding element described with reference to FIGS. 6 and 10. Synthetic image 750 is an example of, or includes aspects of, the corresponding element described with reference to FIGS. 3 and 10.

Figure 8:
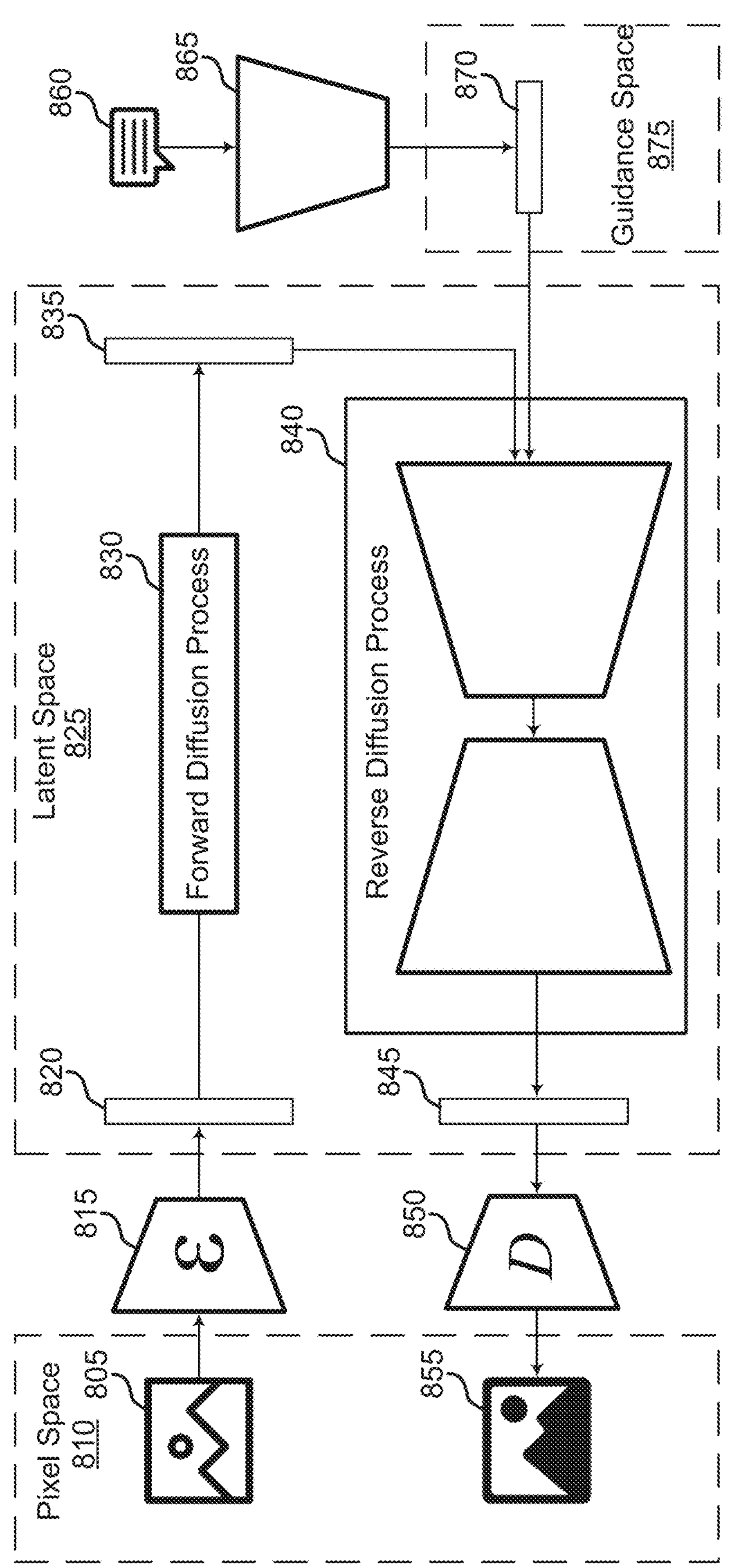
FIG. 8 shows an example of an image generation model according to aspects of the present disclosure.

FIG. 8 shows an example of an image generation model according to aspects of the present disclosure. The example shown includes diffusion model 800, original image 805, pixel space 810, image encoder 815, original image feature 820, latent space 825, forward diffusion process 830, noisy feature 835, reverse diffusion process 840, denoised image feature 845, image decoder 850, output image 855, text prompt 860, text encoder 865, guidance feature 870, and guidance space 875.

Diffusion models are a class of generative neural networks that can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance, color guidance, style guidance, and image guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (e.g., latent diffusion).

Diffusion models work by iteratively adding noise to the data during a forward process and then learning to recover the data by denoising the data during a reverse process. For example, during training, diffusion model 800 may take an original image 805 in a pixel space 810 as input and apply an image encoder 815 to convert original image 805 into original image feature 820 in a latent space 825. Then, a forward diffusion process 830 gradually adds noise to the original image feature 820 to obtain noisy feature 835 (also in latent space 825) at various noise levels.

Next, a reverse diffusion process 840 (e.g., a U-Net ANN) gradually removes the noise from the noisy feature 835 at the various noise levels to obtain the denoised image feature 845 in latent space 825. In some examples, denoised image feature 845 is compared to the original image feature 820 at each of the various noise levels, and parameters of the reverse diffusion process 840 of the diffusion model are updated based on the comparison. Finally, an image decoder 850 decodes the denoised image feature 845 to obtain an output image 855 in pixel space 810. In some cases, an output image 855 is created at each of the various noise levels. The output image 855 can be compared to the original image 805 to train the reverse diffusion process 840. In some cases, output image 855 refers to the synthetic image (e.g., described with reference to FIGS. 3, 4, 7, and 10).

In some cases, image encoder 815 and image decoder 850 are pre-trained prior to training the reverse diffusion process 840. In some examples, image encoder 815 and image decoder 850 are trained jointly, or the image encoder 815 and image decoder 850 are fine-tuned jointly with the reverse diffusion process 840.

The reverse diffusion process 840 can also be guided based on a text prompt 860, or another guidance prompt, such as an image, a layout, a style, a color, a segmentation map, etc. The text prompt 860 can be encoded using a text encoder 865 (e.g., a multimodal encoder) to obtain guidance feature 870 in guidance space 875. The guidance feature 870 can be combined with the noisy feature 835 at one or more layers of the reverse diffusion process 840 to ensure that the output image 855 includes content described by the text prompt 860. For example, guidance feature 870 can be combined with the noisy feature 835 using a cross-attention block within the reverse diffusion process 840.

Cross-attention, also known as multi-head attention, is an extension of the attention mechanism used in some ANNs, for example, for NLP tasks. In some cases, cross-attention attends to multiple parts of an input sequence simultaneously, capturing interactions and dependencies between different elements. In cross-attention, there are two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring the similarity between each query representation and the key representations, where a higher similarity indicates that more attention is given to a key element. An attention score indicates the importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, enabling the machine learning model to understand the context and generate more accurate and contextually relevant outputs.

In some examples, diffusion models are based on a neural network architecture known as a U-Net. The U-Net takes input features having an initial resolution and an initial number of channels, and processes the input features using an initial neural network layer (e.g., a convolutional network layer) to generate intermediate features. The intermediate features are then down-sampled using a down-sampling layer such that down-sampled features have a resolution less than the initial resolution and a number of channels greater than the initial number of channels.

This process is repeated multiple times, and then the process is reversed. For example, the down-sampled features are up-sampled using the up-sampling process to obtain up-sampled features. The up-sampled features can be combined with intermediate features having the same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features may include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt (e.g., text prompt 860) describing content to be included in a generated image. In some examples, guidance can be provided in a form other than text, such as via an image, a sketch, a color, a style, or a layout. The system converts text prompt 860 (or other guidance) into a conditional guidance vector or other multi-dimensional representation. For example, text may be converted into a vector or a series of vectors using a transformer model, or a multimodal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the diffusion model 800 generates an image based on the noise map and the conditional guidance vector.

A diffusion process can include both a forward diffusion process 830 for adding noise to an image (e.g., original image 805) or features (e.g., original image feature 820) in a latent space 825 and a reverse diffusion process 840 for denoising the images (or features) to obtain a denoised image (e.g., output image 855). The forward diffusion process 830 can be represented as $q(x_t|x_{t-1})$, and the reverse diffusion process 840 can be represented as $p(x_{t-1}|x_t)$. In some cases, the forward diffusion process 830 is used during training to generate images with successively greater noise, and a neural network is trained to perform the reverse diffusion process 840 (e.g., to successively remove the noise).

In an example forward diffusion process 830 for a latent diffusion model (e.g., diffusion model 800), the diffusion model 800 maps an observed variable $x_0$ (either in a pixel space 810 or a latent space 825) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse diffusion process 840. During the reverse diffusion process 840, the diffusion model 800 begins with noisy data $x_T$, such as a noisy image and denoises the data to obtain the $p(x_{t-1}|x_t)$. At each step t−1, the reverse diffusion process 840 takes $x_t$, such as the first intermediate image, and t as input. Here, t represents a step in the sequence of transitions associated with different noise levels, The reverse diffusion process 840 outputs $x_{t-1}$, such as the second intermediate image iteratively until $x_T$ is reverted back to $x_0$, the original image 805. The reverse diffusion process 840 can be represented as:

$$p_\theta(x_{t-1}|x_t) := N\left(x_{t-1}; \mu_\theta(x_t, t), \sum\nolimits_\theta(x_t, t)\right). \tag{1}$$

The joint probability of a sequence of samples in the Markov chain can be written as a product of conditionals and the marginal probability:

$$x_T : p_\theta(x_{0:T}) := p(x_T)\prod\nolimits_{t=1}^{T} p_\theta(x_{t-1}|x_t), \tag{2}$$

where $p(x_T)=N(x_T; 0, I)$ is the pure noise distribution as the reverse diffusion process 840 takes the outcome of the forward diffusion process 830, a sample of pure noise, as input and $$\prod\nolimits_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space 825 as input and a generated data $\tilde{x}$ is mapped back into the pixel space 810 from the latent space 825 as output. In some examples, $x_0$ represents an original input image with low image quality, latent variables $x_1, \ldots, x_T$ represent noisy images, and $\tilde{x}$ represents the generated image with high image quality.

A diffusion model 800 may be trained using both a forward diffusion process 830 and a reverse diffusion process 840. In one example, the user initializes an untrained model. Initialization can include defining the architecture of the model and establishing initial values for the model parameters. In some cases, the initialization can include defining hyper-parameters such as the number of layers, the resolution and channels of each layer block, the location of skip connections, and the like.

The system then adds noise to a training image using a forward diffusion process 830 in N stages. In some cases, the forward diffusion process 830 is a fixed process where Gaussian noise is successively added to an image. In latent diffusion models, the Gaussian noise may be successively added to features (e.g., original image feature 820) in a latent space 825.

At each stage n, starting with stage N, a reverse diffusion process 840 is used to predict the image or image features at stage n−1. For example, the reverse diffusion process 840 can predict the noise that was added by the forward diffusion process 830, and the predicted noise can be removed from the image to obtain the predicted image. In some cases, an original image 805 is predicted at each stage of the training process.

The training component (e.g., training component described with reference to FIG. 6) compares predicted image (or image features) at stage n−1 to an actual image (or image features), such as the image at stage n−1 or the original input image. For example, given observed data x, the diffusion model 800 may be trained to minimize the variational upper bound of the negative log-likelihood $-\log p_\theta(x)$ of the training data. The training component then updates parameters of the diffusion model 800 based on the comparison. For example, the parameters of a U-Net may be updated using gradient descent. Time-dependent parameters of the Gaussian transitions can also be learned.

Diffusion Process

Figure 9:
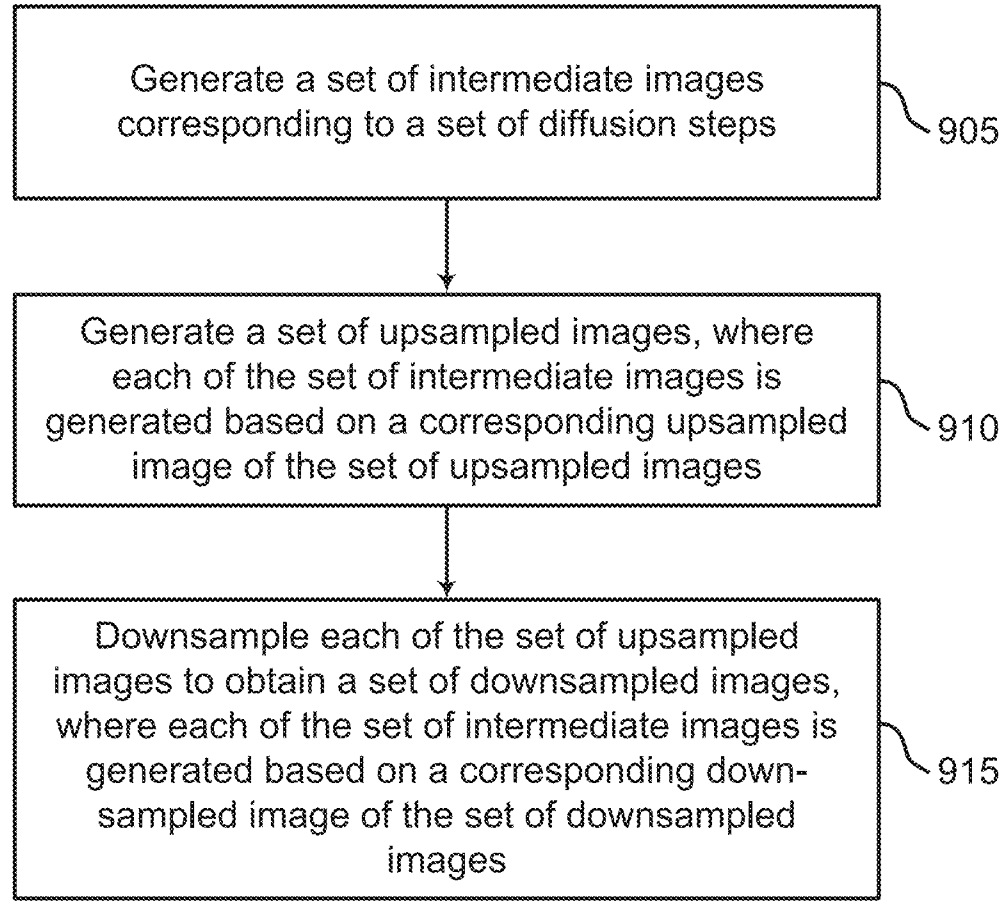
FIG. 9 shows an example of a method for generating an intermediate image according to aspects of the present disclosure.

FIG. 9 shows an example of a method 900 for generating an intermediate image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates a set of intermediate images corresponding to a set of diffusion steps. In some cases, the operations of this step refer to, or may be performed by, a generator as described with reference to FIGS. 6, 7, and 10. For example, each of the set of intermediate images is generated at each diffusion timestep. In some cases, a subsequent intermediate image from the set of intermediate images has a higher resolution than a previous intermediate image from the set of intermediate images. Further detail on the intermediate images is described with reference to FIG. 10.

At operation 910, the system generates a set of upsampled images, where each of the set of intermediate images is generated based on a corresponding upsampled image of the set of upsampled images. In some cases, the operations of this step refer to, or may be performed by, an upsampler as described with reference to FIGS. 6, 7, and 10. For example, the upsampler generates an upsampled image based on the noisy image (described with reference to FIG. 7), the effect embedding, and the intermediate image at each diffusion timestep. At the final diffusion step, the upsampled image is the synthetic image. Further detail on the upsampled image is described with reference to FIG. 10.

At operation 915, the system downsamples each of the set of upsampled images to obtain a set of downsampled images, where each of the set of intermediate images is generated based on a corresponding down-sampled image of the set of downsampled images. In some cases, the operations of this step refer to, or may be performed by, a downsampler as described with reference to FIG. 6. In some cases, the upsampled image is concatenated with the noisy image input to the generator to obtain a second noisy image. In some cases, the second noisy image is used as input to the generator at the next diffusion step. Further detail on the downsampled image is described with reference to FIG. 10.

Figure 10:
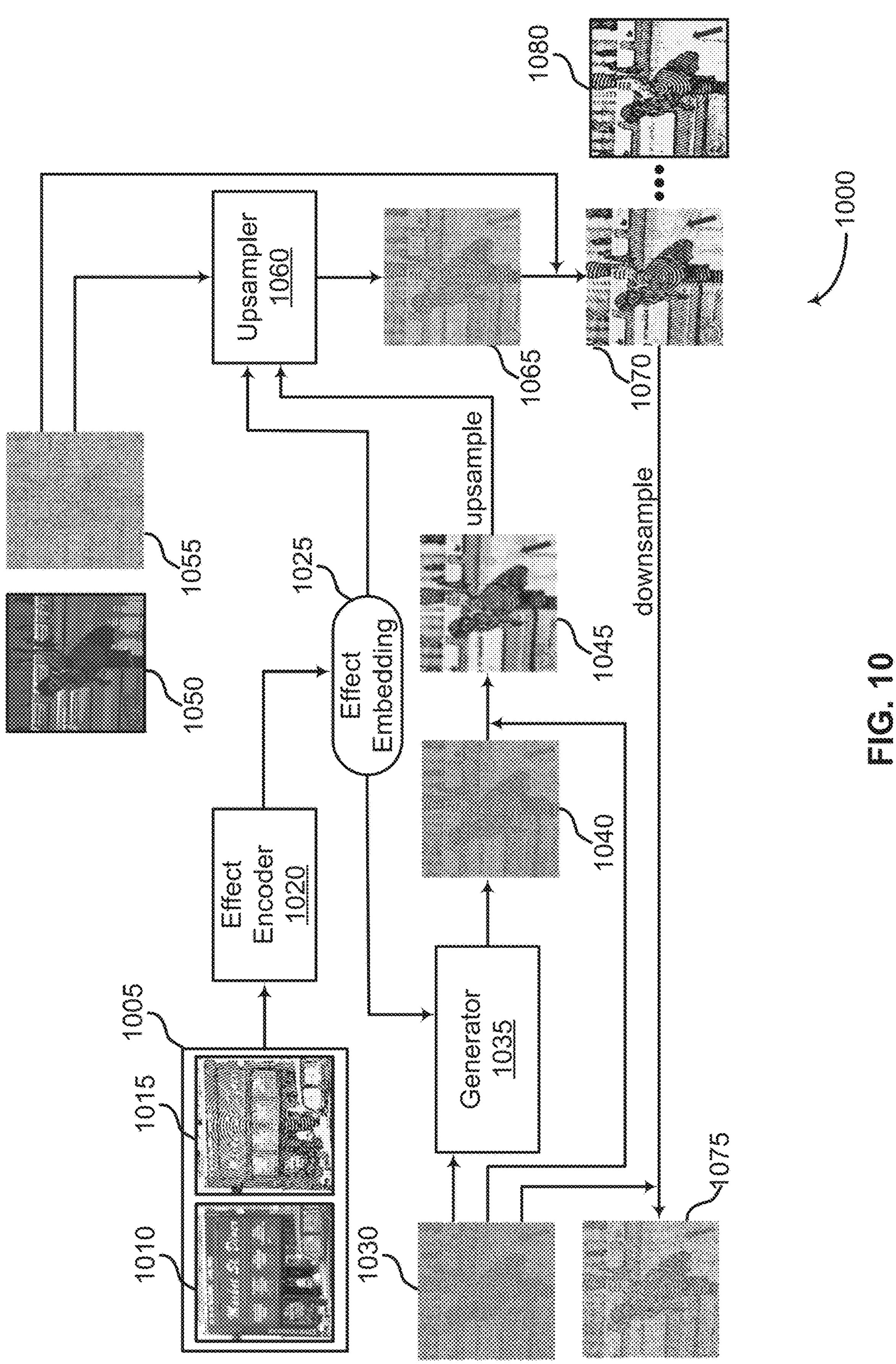
FIG. 10 shows an example of a diffusion process of an image generation model according to aspects of the present disclosure.

FIG. 10 shows an example of a diffusion process of an image generation model 1000 according to aspects of the present disclosure. The example shown includes image generation model 1000, reference effect prompt 1005, effect encoder 1020, effect embedding 1025, low-resolution noise input 1030, generator 1035, low-resolution predicted noise 1040, intermediate image 1045, input image 1050, noisy image 1055, upsampler 1060, high-resolution predicted noise 1065, high-resolution denoised image 1070, low-resolution noisy image 1075, and synthetic image 1080. In one aspect, reference effect prompt 1005 includes reference image 1010 and effect image 1015.

Referring to FIG. 10, image generation model 1000 receives reference effect prompt 1005 and input image 1050 to generate synthetic image 1080. For example, reference effect prompt 1005 includes reference image 1010 and effect image 1015. Reference image 1010 and effect image 1015 are input into effect encoder 1020 to generate effect embedding 1025. In some cases, effect embedding 1025 is in a text embedding space. In some cases, effect embedding 1025 includes information about the image effect in reference effect prompt. Generator 1035 receives low-resolution noise input 1030 to generate low-resolution predicted noise 1040. In one aspect, generator 1035 takes effect embedding 1025 as guidance to guide the image generation process. In some cases, the low-resolution predicted noise 1040 is denoised into intermediate image 1045. In some cases, intermediate image 1045 is a low-resolution image.

In some aspects, for example, effect encoder 1020 includes a pre-trained CLIP (Contrastive Language-Image Pre-Training) encoder configured to extract semantic-aware features. In some aspects, effect encoder 1020 (or effect injector J) further includes a fully connected projector P on the encoded features. Effect encoder 1020 subtracts between the projected features to represent the transformation from reference image 1010 (or A) to effect image 1015 (or A') as the target image effect. In some embodiments, a combination R of self-attention blocks, a 1D convolution layer and a fully connected layer is used to align the dimensions of the effect embedding with the original text embedding of generator 1035. Generating effect embedding 1025 using effect encoder 1020 can be represented as:

$$J(A, A') := R(P(E(A')) - P(E(A))). \tag{3}$$

According to some embodiments, each diffusion timestep of image generation process is performed using generator 1035 and upsampler 1060. For example, at the first diffusion timestep, low-resolution noise input 1030 includes a random noise. In subsequent diffusion timesteps, low-resolution noise input 1030 includes a low-resolution noise having features of input image 1050. In the first diffusion timesteps, for example, intermediate image 1045 is upsampled and input into upsampler 1060. In some cases, noise is added to input image 1050 to obtain noisy image 1055. Upsampler 1060 receives noisy image 1055, effect embedding 1025, and the upsampled intermediate image to generate high-resolution predicted noise 1065. The high-resolution predicted noise 1065 is denoised into high-resolution denoised image 1070. In one embodiment, high-resolution denoised image 1070 is downsampled and combined with low-resolution noise input 1030 to generate low-resolution noisy image 1075. Then, low-resolution noisy image 1075 is used as input to generator 1035 at the next diffusion timestep (e.g., the second diffusion timestep). In some cases, the second diffusion timestep is immediate after the first diffusion timestep.

According to some embodiments, generator 1035 and upsampler 1060 include diffusion models. For example, the diffusion process of the diffusion model includes a forward diffusion process and a reverse diffusion process (as described with reference to FIG. 8). During the forward diffusion process, the diffusion model samples T steps to generate a sequence of noisy image $\{x_t\}_{t\in[1,T]}$ by progressively adding Gaussian noise $\epsilon_t$ to an input image $x_0$. The noisy image at each timestep t can be calculated as:

$$x_t = \sqrt{\overline{\alpha}_t}\, x_0 + \sqrt{1-\overline{\alpha}_t}\, \epsilon_t, \tag{4}$$

where $\alpha_t := 1-\beta_t$ ($\beta_t \in (0,1)$) is a variable related to t. During the reverse diffusion process, the diffusion model initiates from a standard Gaussian noise $x_T$ and iteratively estimates a parameterized Gaussian transition $p_\theta(x_{t-1}|x_t)$ with a learnable mean $\mu_\theta(x_t, t)$.

Then, the denoised estimation can be calculated as:

$$\begin{aligned} x_{t-1} \sim p_\theta(x_{t-1}|x_t) &:= \mathcal{N}(x_{t-1}, \mu_\theta(x_t, t), \sigma_t^2 I), \\ &= \frac{1}{\sqrt{\alpha_t}}\left(x_t - \frac{1-\alpha_t}{\sqrt{1-\overline{\alpha}_t}}\epsilon_\theta(x_t, t, c)\right) + \sigma_t z, \end{aligned} \tag{5}$$

where z and I are random Gaussian noise, c represents conditions that guide the denoising process, and $\epsilon_\theta$ represents the diffusion model with parameters θ. By minimizing the difference between $\epsilon_\theta(x_t, t, c)$ and $\epsilon_t$, the diffusion model $\epsilon_\theta$ learns to approximate the noise in $x_t$ to progressively reconstruct the input image $x_0$ (when t=1). By replacing $\epsilon_t$ in equation 4 with $\epsilon_\theta(x_t, t, c)$ and substituting it into equation 5, the model can compute the denoised image from:

$$x_{t-1} = \eta_t x_t^2 + \zeta_t x_t + \sigma_t z, \tag{6}$$

-continued $$\text{where } \eta_t = \frac{\sqrt{1-\bar{\alpha}_t}\,\beta_t}{1-\bar{\alpha}_t},\ \zeta_t = \frac{\sqrt{\alpha_t}\,(1-\bar{\alpha}_{t-1})}{1-\bar{\alpha}_t}, \tag{7}$$

$$x_t^0 = \frac{x_t}{\sqrt{\bar{\alpha}_t}} - \frac{\sqrt{1-\bar{\alpha}_t}}{\sqrt{\bar{\alpha}_t}}\epsilon_\theta(x_t, t, c), \tag{8}$$

where $$x_t^0$$

represents an output image sampled from $x_t$.

In some embodiments, reference effect prompt 1005 includes a before-and-after pair (A: A') (e.g., reference image 1010 and effect image 1015) indicating a target effect or the image effect. The image generation model 1000 generates the same image effect on input image 1050. In some cases, the synthetic image 1080 preserves the same content details as input image 1050. In some cases, image generation model 1000 include effect encoder 1020 (or sometimes referred to as effect injector J) trained to generate effect embedding 1025 (J(A, A')) to replace text embedding for guiding the generation of image effects without altering a pre-trained text-to-image diffusion model. In some aspects, the training of the diffusion model (e.g., the generator 1035) does not require a large-scale set of training data.

According to some embodiments, upsampler 1060 is a diffusion-based upsampler. Upsampler 1060 takes a high-resolution noisy image $u_t$ (e.g., noisy image 1055) ($u_T$ is the standard Gaussian noise) as input and denoises the high-resolution noisy image to a clean image $u_0$, which is synthetic image 1080. According to embodiments of the present disclosure, upsampler 1060 receives effect embedding 1025 and input image 1050 as inputs. In some cases, effect embedding 1025 includes different effects and has different characteristics and details to be preserved. In some cases, effect embedding 1025 includes structure preservation and/or color preservation. Effect encoder 1020 is trained to adapt detail preservation for various image effects. In some cases, the clean image generated by upsampler 1060 and input to generator 1035 are combined at each timestep t for content preservation.

In some embodiments, at each timestep t, generator receives noisy low-resolution image $x_t$ (e.g., low-resolution noise input 1030) as input and effect embedding 1025 injected through a cross-attention layer by replacing the text embedding of the generator 1035 (e.g., c=J(A, A')). After predicting the noise $\epsilon_\theta$ ($x_t$, t, J(A, A')), a clean image $$x_t^0$$

is sampled from $x_t$ from equation 7. Then, the upsampler 1060 takes noisy high-resolution image $u_t$, effect embedding J(A, A'), input image B, and resized $$x_t^0$$

as inputs to generate $$u_t^0$$

as:

$$u_t^0 = \frac{u_t}{\sqrt{\bar{\alpha}_t}} - \frac{\sqrt{1-\bar{\alpha}_t}}{\sqrt{\bar{\alpha}_t}} S\big(u_t, t, B, \uparrow(x_t^0), J(A, A')\big), \tag{9}$$

where $\uparrow(\bullet)$ represents a bilinear upsampling operation. Before the next timestep in the diffusion process, the upsampled result $$u_t^0$$

is combined with $x_t$ as guidance:

$$x_{t-1} = \eta_t \downarrow(u_t^0) + \zeta_t x_{t-} \sigma_t z, \tag{10}$$

where $\downarrow(\bullet)$ represents a bilinear downsampling operation.

According to some embodiments, $x_{t-1}$ is used as the noisy image to initiate the diffusion process of generator 1035 for the next timestep in the diffusion process. The diffusion process is repeated until timestep t, where at the final timestep, synthetic image 1080 is generated.

Image generation model 1000 is an example of, or includes aspects of, the corresponding element described with reference to FIGS. 3, 4, and 6. Reference effect prompt 1005 is an example of, or includes aspects of, the corresponding element described with reference to FIGS. 3 and 7. Reference image 1010 is an example of, or includes aspects of, the corresponding element described with reference to FIGS. 3 and 7. Effect image 1015 is an example of, or includes aspects of, the corresponding element described with reference to FIGS. 3 and 7.

Effect encoder 1020 is an example of, or includes aspects of, the corresponding element described with reference to FIGS. 6 and 7. Effect embedding 1025 is an example of, or includes aspects of, the corresponding element described with reference to FIG. 7. Generator 1035 is an example of, or includes aspects of, the corresponding element described with reference to FIGS. 6 and 7. Intermediate image 1045 is an example of, or includes aspects of, the corresponding element described with reference to FIG. 7.

Input image 1050 is an example of, or includes aspects of, the corresponding element described with reference to FIGS. 3, 4, and 7. Upsampler 1060 is an example of, or includes aspects of, the corresponding element described with reference to FIGS. 6 and 7. Synthetic image 1080 is an example of, or includes aspects of, the corresponding element described with reference to FIGS. 3 and 7.

Training and Evaluation

In FIG. 11, a method, apparatus, non-transitory computer readable medium, and system for training a machine learning model include obtaining a training set including a training image, an effect prompt indicating an effect for the training image, and a ground-truth image depicting the effect applied to the training image, and training, using the training set, an image generation model to apply image effects, where the image generation model includes a generator that generates an intermediate image based on the effect prompt and an upsampler that generates a synthetic image based on the training image, the effect prompt, and the intermediate image.

Some examples of the method, apparatus, non-transitory computer readable medium, and system further include computing an upsampling loss. Some examples further include updating parameters of the upsampler based on the upsampling loss. Some examples of the method, apparatus, non-transitory computer readable medium, and system further include computing an effect loss. Some examples further include updating parameters of an effect encoder of the image generation model based on the effect loss.

Some examples of the method, apparatus, non-transitory computer readable medium, and system further include freezing the generator while training the upsampler. Some examples of the method, apparatus, non-transitory computer readable medium, and system further include applying the effect to the training image to obtain the ground-truth image. Some examples of the method, apparatus, non-transitory computer readable medium, and system further include obtaining a reference image. Some examples further include applying the effect to the reference image to obtain an effect image, wherein the effect prompt includes the reference image and the effect image.

FIG. 11 shows an example of a method 1100 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system obtains a training set including a training image, an effect prompt indicating an effect for the training image, and a ground-truth image depicting the effect applied to the training image. In some cases, the operations of this step refer to, or may be performed by, a training component as described with reference to FIG. 6. In some embodiments, the system includes a data preparation component (described with reference to FIG. 6) that creates a training set. For example, the data preparation component creates the paired training set including a pair of training image B and a ground-truth image B', and a pair of training reference image A and an effect image A'. In some cases, training image B and reference image A depict different contents. In some embodiments, an image processing application is used to generate the training set. For example, various image effects such as blur kernels, translations, and filters are applied to the training reference image A to generate the effect image A'. In some cases, Photoshop is used to apply the image effects. In some cases, a combination of meta-operators in Photoshop is used to generate the training images. In some cases, the same image effect is applied to A and B to generate the corresponding effect images A' and B'. Accordingly, the data preparation component can generate the training set including (A: A':: B:B').

In some cases, a total of 520 sets of training images are generated, of which 450 sets are used for training and the remaining sets are used as testing sets. In some embodiments, the image generator is initialized with, for example, the pre-trained DeepFloyd IF-I-L (900M) weight, and the upsampler is initialized with DeepFloyd IF-II-M (450M) weight. During a first training stage, the generator is frozen and the effect encoder is trained. In some cases, the learning rate is set to $5e^{-5}$ with a batch size of 320. Then, in a second training stage, a CLIP model in the effect encoder is frozen, and the upsampler and the adaptor in the effect encoder are trained with a learning rate of $5e^{-5}$ and $1e^{-5}$, respectively. In some cases, the batch size is set to 40.

At operation 1110, the system trains, using the training set, an image generation model to apply image effects, where the image generation model includes a generator that generates an intermediate image based on the effect prompt and an upsampler that generates a synthetic image based on the training image, the effect prompt, and the intermediate image. In some cases, the operations of this step refer to, or may be performed by, a training component as described with reference to FIG. 6.

In some embodiments, the training component computes an effect loss based on the effect prompt including the training reference image A and the effect image A'. In some cases, the effect encoder is trained jointly with a frozen pre-trained diffusion mode, where the parameters of the effect encoder are updated using the effect loss:

$$\mathcal{L}_J = \min_{\theta} \|\epsilon_\theta(x_t, t, J(A, A')) - \epsilon_t\|^2, \quad (11)$$

where $x_t$ represents the sampled image from the ground-truth image B'.

In some embodiments, the training component computes a visual loss based on the synthetic image, training input image, and the effect prompt including the training reference image A and the effect image A'. For example, the upsampler is trained to minimize the visual loss using:

$$\mathcal{L}_S = \min_{\vartheta} \left\| S\left(u_t, t, B, \uparrow\left(x_t^0\right), J(A, A')\right) - \epsilon_t^{\uparrow} \right\|^2, \quad (12)$$

where $$\epsilon_t^{\uparrow}$$

represents a standard Gaussian noise.

Computing Device

FIG. 12 shows an example of a computing device 1200 according to aspects of the present disclosure. The example shown includes computing device 1200, processor 1205, memory subsystem 1210, communication interface 1215, I/O interface 1220, user interface component 1225, and channel 1230.

In some embodiments, computing device 1200 is an example of, or includes aspects of, the image processing apparatus described with reference to FIGS. 1 and 6. In some embodiments, computing device 1200 includes processor 1205 that can execute instructions stored in memory subsystem 1210 to obtain an input image and a reference effect prompt, generate an intermediate image based on the reference effect prompt, and generate a synthetic image based on the input image, the reference effect prompt, and the intermediate image.

According to some embodiments, processor 1205 includes one or more processors. In some cases, processor 1205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, processor 1205 is configured to operate a memory array using a memory controller. In other cases, a memory controller is integrated into processor 1205. In some cases, processor 1205 is configured to execute computer-readable instructions stored in a memory to perform various functions. In some embodiments, processor 1205 includes special-purpose components for modem processing, baseband processing, digital signal processing, or transmission processing. Processor 1205 is an example of, or includes aspects of, the processor unit described with reference to FIG. 6.

According to some embodiments, memory subsystem 1210 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1210 is an example of, or includes aspects of, the memory unit described with reference to FIG. 6.

According to some embodiments, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna. In some cases, a bus is used in communication interface 1215.

According to some embodiments, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or hardware components controlled by the I/O controller.

According to some embodiments, user interface component 1225 enables a user to interact with computing device 1200. In some cases, user interface component 1225 includes an audio device, such as an external speaker system, an external display device such as a display screen, an input device (e.g., a remote-control device interfaced with a user interface directly or through the I/O controller), or a combination thereof.

The performance of apparatus, systems, and methods of the present disclosure have been evaluated, and results indicate embodiments of the present disclosure have obtained increased performance over conventional technology (e.g., conventional image generation models). Example experiments demonstrate that the image processing apparatus based on the present disclosure outperforms conventional image generation models. Details on the example use cases based on embodiments of the present disclosure are described with reference to FIGS. 3 and 4.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an input image and a reference effect prompt, wherein the reference effect prompt indicates an image effect for the input image;

generating, using a generator of an image generation model, an intermediate image based on the reference effect prompt, wherein the intermediate image depicts the image effect applied to the input image; and upsampling, using an upsampler of the image generation model, the intermediate image to generate a synthetic image based on the reference effect prompt, wherein the synthetic image depicts the image effect applied to the input image and has a higher resolution than the intermediate image.

2. The method of claim 1, further comprising:

generating an effect embedding based on the reference effect prompt, wherein the effect embedding represents the image effect in a vector space.

3. The method of claim 1, wherein obtaining the reference effect prompt comprises:

obtaining a reference image and an effect image, wherein the effect image depicts the image effect applied to the reference image.

4. The method of claim 1, wherein generating the intermediate image comprises:

generating a plurality of intermediate images corresponding to a plurality of diffusion steps.

5. The method of claim 4, further comprising:

generating a plurality of upsampled images, wherein each of the plurality of intermediate images is generated based on a corresponding upsampled image of the plurality of upsampled images.

6. The method of claim 5, further comprising:

downsampling each of the plurality of upsampled images to obtain a plurality of downsampled images, wherein each of the plurality of intermediate images is generated based on a corresponding down-sampled image of the plurality of downsampled images.

7. The method of claim 1, wherein generating the synthetic image comprises:

adding noise to the input image to obtain a high-resolution noise image, wherein the synthetic image is generated based on the high-resolution noise image.

8. The method of claim 1, further comprising:

obtaining an additional reference effect prompt indicating an additional image effect, wherein the synthetic image depicts the image effect and the additional image effect applied to the input image.

9. The method of claim 1, wherein:

the image generation model is trained to apply image effects based on a training set including a training image, a training effect prompt indicating a training effect for the training image, and a ground-truth image depicting the training effect applied to the training image.

10. A method comprising:

obtaining a training set including a training image, an effect prompt indicating an effect for the training image, and a ground-truth image depicting the effect applied to the training image; and training, using the training set, an upsampler of an image generation model to perform upsampling based on the effect prompt, wherein the image generation model includes a generator that generates an intermediate image based on the effect prompt and the upsampler that upsamples the intermediate image to generate a synthetic image having the effect.

11. The method of claim 10, wherein training the image generation model comprises:

computing an upsampling loss by comparing an output of the upsampler to the ground-truth image; and updating parameters of the upsampler based on the upsampling loss.

12. The method of claim 10, wherein training the image generation model comprises:

freezing the generator while training the upsampler.

13. The method of claim 10, wherein training the image generation model comprises:

computing an effect loss; and updating parameters of an effect encoder of the image generation model based on the effect loss.

14. The method of claim 10, wherein obtaining the training set comprises:

applying the effect to the training image to obtain the ground-truth image.

15. The method of claim 14, wherein obtaining the training set comprises:

obtaining a reference image; and applying the effect to the reference image to obtain an effect image, wherein the effect prompt includes the reference image and the effect image.

16. An apparatus comprising:

at least one processor;

at least one memory storing instructions executable by the at least one processor; and an image generation model comprising parameters stored in the at least one memory, wherein the image generation model includes a generator that generates an intermediate image based on a reference effect prompt that indicates an image effect for an input image and an upsampler trained to upsample the intermediate image to generate a synthetic image based on the input image and the reference effect prompt, wherein the synthetic image depicts the image effect applied to the input image and has a higher resolution than the intermediate image.

17. The apparatus of claim 16, wherein the image generation model comprises:

an effect encoder trained to generate an effect embedding based on the reference effect prompt.

18. The apparatus of claim 16, wherein:

the generator and the upsampler comprise diffusion models.

19. The apparatus of claim 16, wherein:

the intermediate image is generated based on an output of the upsampler.

20. The apparatus of claim 19, further comprising:

a downsampler is configured to downsample the output of the upsampler to obtain a downsampled image, wherein the intermediate image is generated based on the downsampled image.

* * * * *